(12) United States Patent
Zhao et al.

(10) Patent No.: US 8,416,690 B2
(45) Date of Patent: Apr. 9, 2013

(54) EXPLICIT CONGESTION NOTIFICATION BASED RATE ADAPTATION USING BINARY MARKING IN COMMUNICATION SYSTEMS

(75) Inventors: Xiaoming Zhao, Plano, TX (US); David Furbeck, Irving, TX (US); Richard Charles Burbidge, Slough (GB)

(73) Assignee: Research In Motion Limited, Waterloo, Ontario (CA)

( * ) Notice: Subject to any disclaimer, the term of this patent is extended or adjusted under 35 U.S.C. 154(b) by 262 days.

(21) Appl. No.: 12/685,630

(22) Filed: Jan. 11, 2010

(65) Prior Publication Data

US 2011/0170410 A1    Jul. 14, 2011

(51) Int. Cl.
*H04L 1/00*    (2006.01)

(52) U.S. Cl.
USPC .......................................... 370/234; 370/328

(58) Field of Classification Search ........................ None
See application file for complete search history.

(56) References Cited

U.S. PATENT DOCUMENTS

| | | | |
|---|---|---|---|
| 7,000,025 B1 | 2/2006 | Wilson | |
| 7,088,735 B1 | 8/2006 | Reohr et al. | |
| 7,145,887 B1* | 12/2006 | Akgun et al. | 370/321 |
| 7,382,776 B1 | 6/2008 | Chan et al. | |
| 7,839,777 B2 | 11/2010 | DeCusatis et al. | |
| 7,859,996 B2 | 12/2010 | Kwan et al. | |
| 7,961,605 B2 | 6/2011 | Gusat et al. | |
| 2003/0128672 A1* | 7/2003 | Komandur et al. | 370/315 |
| 2006/0092836 A1 | 5/2006 | Kwan et al. | |
| 2008/0198746 A1* | 8/2008 | Kwan et al. | 370/231 |
| 2008/0304413 A1 | 12/2008 | Briscoe et al. | |
| 2009/0067335 A1 | 3/2009 | Pelletier et al. | |
| 2009/0086637 A1 | 4/2009 | DeCusatis et al. | |
| 2009/0215447 A1* | 8/2009 | Catalano et al. | 455/432.1 |
| 2010/0034090 A1 | 2/2010 | Bader et al. | |
| 2011/0125833 A1* | 5/2011 | Persson et al. | 709/203 |

FOREIGN PATENT DOCUMENTS

WO    WO 2008/055534 A1    5/2008

OTHER PUBLICATIONS

IETF RFC 3168 "The Addition of Explicit Congestion Notification (ECN) to IP", Sep. 2001.*
IEFT draft "An Effective way for Enhancement of TCP Performance in Wireless and Mobile Networks", draft-fpeng-wecn-04.txt, Jun. 2001.*
"LS on Vocoder Rate Adaptation for LTE", RP-090664, 3GPP TSG RAN Plenary Meeting #44, Oranjestadt, Aruba, Netherlands, May 2009, 1 page.
"System aspects of vocoder rate adaptation for LTE", SP-090653, TSG-RAN Meeting 45, Sevilla, Spain, Aug. 2009, pp. 1-4.
"Enabling Encoder Selection and Rate Adaptation for UTRAN and E-UTRAN", S2-095739, 3GPP TSG-SA WG2 Meeting #75, Kyoto, Japan, Aug. 2009, pp. 1-5.

(Continued)

*Primary Examiner* — Jianye Wu
(74) *Attorney, Agent, or Firm* — Brinks Hofer Gilson & Lione

(57) ABSTRACT

A method, apparatus, and computer program product for responding to congestion levels in a communication system by rate adaptation. A congestion condition is indicated by marking data packets. In response to receiving an indication of congestion, a data rate is reduced. A rate reduction inhibit timer is started, and further rate reduction is initiated if congestion is indicated after the rate reduction inhibit timer has expired. A rate increase timer is used to initiate a rate increase if no indication of congestion is received during a rate increase time.

36 Claims, 11 Drawing Sheets

OTHER PUBLICATIONS

Ramakrishnan et al., "RFC 3168—The Addition of Explicit Congestion Notification (ECN) to IP", Sep. 2001, pp. 1-64.

Westerlund et al., "Explicit Congestion Notification (ECN) for RTP over UDP" draft to expire Apr. 29, 2010, pp. 1-46 http://www.ietf.org/internet-drafts/draft-westerlund-avt-ecn-for-rtp-01.txt.

Wenger et al., "RFC 5104—Codec Control Messages in teh RTP Audio-Visual Profile with Feedback (AVPF)", Feb. 2008, pp. 1-65 http://tools.ietf.org/html/rfc5104.

"3GPP Specification detail", retrieved Dec. 31, 2009, pp. 1-2 http://www.3gpp.org/ftp/Specs/html-info/26114.htm.

"Vocoder rate adaptation for LTE", 3GPP Work Item Description, RP-090660, TSG-RAN Meeting 44, Aruba, Netherlands, May 2009, pp. 1-5.

"Change Request", 3GPP TSG-SA4 Meeting #57, St. Julian, Malta, Jan. 2010, pp. 1-4.

"ECN configuration parameters", S4-090837, Telefon AB LM Ericsson, ST Ericsson (France) SAS, 3GPP TSG-SA4#56, Sophia Antipolis, France, Nov. 2009, pp. 1-4.

"3rd Generation Partnership Project; Technical Specification Group Services and System Aspects; General packet Radio Service (GPRS) enhancements of Evolved Universal Terrestrial Radio Access Network (E-UTRAN) access (Release 9)", LTE3GPP TS 23.401 v9.3.0 (Dec. 2009) Technical Specification, pp. 1-254.

International Search Report for PCT Application No. PCT/US2011/020755, mailed Apr. 1, 2011.

International Search Report and Written Opinion for PCT Application No. PCT/US2011/020770, mailed Jun. 7, 2011.

* cited by examiner

EXPLICIT CONGESTION NOTIFICATION BASED RATE ADAPTATION USING BINARY MARKING IN COMMUNICATION SYSTEMS

TECHNICAL FIELD

The present disclosure relates generally to a communication system and, in particular, to a method and apparatus for responding to congestion in a communication system.

BACKGROUND

A mobile or cellular telephone system is an example of a communication system that is capable of transmitting and receiving data between end user equipment or applications and network equipment. Transmitted and received data may be in the form of data packets. Transmitted data packets may be in a variety of formats and include a variety of different types of data, including voice data, binary data, video data, and the like.

In a communication system, such as a mobile or cellular telephone communication system, various methods are used to establish the rate of communication or bitrate at which data packets are transferred between a user's mobile device, such as a mobile telephone, and the rest of the system. For example, if Adaptive MultiRate (AMR) or Adaptive Multi-Rate-Wideband (AMR-WB) transmission is used, at call set-up a mode set is negotiated through the Session Description Protocol (SDP). The Session Description Protocol parameter "mode-set" takes a value that represents a subset of bitrates that can be used during a call. The value is selected from the set $\{0, \ldots, 7\}$ for Adaptive MultiRate transmissions and from the set $\{0, \ldots, 8\}$ for Adaptive MultiRate-Wideband transmissions. The value to be used may be selected, for example, based on detected signal strength between the mobile device and the rest of the network at the time of call set-up. When a sender encodes speech it must use one of the bitrates in the mode set. The mode used to encode is then indicated to the receiver in a Codec Mode Indication (CMI) field of the Real-time Transport Protocol payload.

For Long Term Evolution (LTE), the relevant specification in terms of codec rate adaptation is 3GPP TS 26.114, which specifies the Multimedia Telephony Services over IP Multimedia Subsystem (MTSI). Included in this specification are several means of adaptation. For example, bit rate, number of frames per packet, and amount of redundant frames per packet, may all be adapted according to requests from the receiver of the encoded media. These requests are generally included in the RTP Control Protocol Application Defined (RTCP APP) packets.

Problems arise in a communication system when demands on the network system to process data packets for transmission through the system in a timely manner exceed network capacity. In such situations the network is said to be experiencing congestion. A typical response to such congestion is for the network simply to drop packets received from, or to be transmitted to, a user application or equipment, and that cannot be processed by the network in a timely manner.

Explicit Congestion Notification (ECN) is a method for the network to indicate to user applications that the network is experiencing congestion. In response to receiving such a notification, a user application or equipment can reduce its sending rate, in order to avoid packets being dropped. For example, Explicit Congestion Notification may be implemented by marking two bits in the Internet Protocol (IP) header of a packet as '11', indicating that congestion is being experienced by a network element processing the packet. Via a feedback mechanism, the sender of the packet is notified of the congestion, and can then reduce its sending rate.

Until recently, it has not been specified how to apply Explicit Congestion Notification to User Datagram Protocol (UDP) traffic. The User Datagram Protocol itself does not contain a feedback mechanism. However, most real-time applications, such as voice, video, real-time text, and the like, use Real-timeTransport Protocol (RTP) over User Datagram Protocol, which does have a feedback mechanism, namely RTP Control Protocol (RTCP). It has been proposed to use Explicit Congestion Notification with Real-time Transport Protocol. In this proposal, the receiver of Internet Protocol packets that are marked "Congestion Experienced" communicates this information to the sender through the RTP Control Protocol feedback packets. The sender can then reduce its bitrate in order to reduce congestion. For Adaptive MultiRate (AMR) or Adaptive MultiRate-Wideband (AMR-WB) transmissions, the sender can change its transmission mode to reduce congestion.

As an alternative, the receiver of packets marked "Congestion Experienced" may use the Codec Mode Request (CMR) field in the Real-time Transport Protocol payload to request that the sender reduce its bitrate. This has the advantage that additional RTP Control Protocol traffic is not created, when the network is already congested, in order to communicate which packets were marked "Congestion Experienced" to the sender. It has the disadvantage that it cannot be used to control bitrates when data packet flow is unidirectional. For codecs that do not have a Codec Mode Request field in the Real-time Transport Protocol payload, and for other media types, it is possible that a Temporary Maximum Media Stream Bit Rate Request (TMMBR) may be used to request the sender to reduce its bitrate.

It would be advantageous to have a method and apparatus that takes into account at least some of the issues discussed above, as well as possibly other issues.

BRIEF DESCRIPTION OF THE DRAWINGS

For a better understanding of the various embodiments described herein, and to show more clearly how they may be carried into effect, reference will now be made, by way of example only, to the accompanying drawings, which show at least one illustrative embodiment and in which.

DETAILED DESCRIPTION

Figure 1:
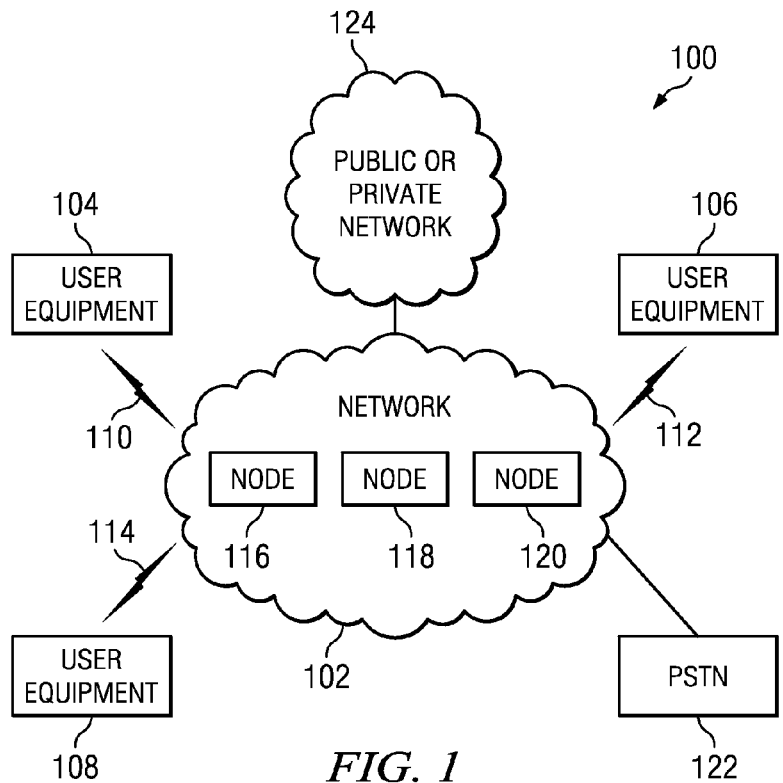
FIG. 1 is a block diagram of an embodiment of a wireless communication system including a wireless network and user equipment in accordance with an illustrative embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The different embodiments disclosed herein recognize and take into account a number of different considerations. For example, the disclosed embodiments recognize and take into account that current communication system specifications do not describe how a sender's bitrate is to be reduced when packets marked to indicate that congestion is being experienced are observed. Consider, for example, the scenario where an Adaptive MultiRate speech codec and the default Adaptive MultiRate mode set for a Multimedia Telephony Service for IP Multimedia Subsystem corresponding to bitrates of 12.2 kbps, 7.4 kbps, 5.9 kbps, and 4.75 kbps is used. If the sender is currently using the 12.2 kbps bitrate, and packets marked "Congestion Experienced" are observed, current specifications do not specify how the sender is to respond. In this case, response options include jumping immediately all the way down to 4.75 kbps or stepping down to the next lowest rate in the mode set and then stepping down again if packets marked "Congestion Experienced" continue to be observed. The disclosed embodiments recognize and take into account that current specifications do not specify how the bitrate should be adapted back up if congestion eases. Furthermore, the disclosed embodiments recognize and take into account that current specifications do not specify how user priority and emergency calls should be handled in the context of a system or method for adapting the bitrate in response to an explicit congestion notification.

The disclosed embodiments recognize and take into account that current solutions for Explicit Congestion Notification employ only an on/off or binary indication of congestion. Either data packets are marked to indicate that congestion is experienced or they are not. The disclosed embodiments recognize and take into account that a mechanism is needed for codec selection and adaptation in communication systems that employ binary "Congestion Experienced" marking for Explicit Congestion Notification.

The disclosed embodiments recognize and take into account that Internet Protocol traffic in a UTRAN or EUTRAN network can be very dynamic. Congestion detection and binary "Congestion Experienced" marking of data packets based on that detection can be very noisy and may be prone to oscillation. This may result in very unstable codec adaptation based network congestion control using Explicit Congestion Notification. Frequent and unnecessary adaptation could have a negative impact on perceived quality by a user.

The embodiments disclosed herein provide a system and method for rate adaptation in a communication system when a receiving terminal receives data packets with "Congestion Experienced" marked or unmarked. In accordance with disclosed embodiments, congestion is indicated as detected by the transmission of marked packets and congestion is indicated as cleared by the transmission of unmarked packets. Based upon the marked or unmarked packets detected, a receiver of the data packets determines a rate reduction or increase based on sequences provided by the network or configured on the receiver. If a rate adaptation is determined to be required, the receiver may send a codec rate change request with the determined rate to the sender.

Embodiments disclosed herein are particularly adapted to a mechanism for Explicit Congestion Notification based codec adaptation using binary "Congestion Experienced" marking in a UMTS Terrestrial Radio Access Network (UTRAN) or an Evolved UTRAN (E-UTRAN). For Long Term Evolution (LTE), the relevant specification in terms of codec rate adaptation is 3GPP TS 26.114, which specifies the Multimedia Telephony Services over IP Multimedia Subsystem (MTSI). Illustrative embodiments are applicable also to other communication systems and radio or fixed networks.

Turning first to FIG. 1, a wireless communication system is depicted in accordance with an illustrative embodiment. Wireless communication system 100 includes wireless network 102. Wireless network 102 may comprise a single network or multiple networks forming a network of networks. Wireless network 102 provides for wireless communication by user equipment 104, 106, and 108 via wireless communication channels 110, 112, and 114 established between user equipment 104, 106, and 108 and wireless network 102. As will be discussed in more detail below, examples of user equipment 104, 106, and 108 include mobile wireless communication devices including pagers, cellular phones, cellular smart-phones, wireless organizers, personal digital assistants, computers, laptops, handheld wireless communication devices, wirelessly enabled notebook computers and the like. Although only three user equipment 104, 106, and 108 are shown by example in FIG. 1, wireless network 102 may support use of much larger numbers of user equipment of various different types.

Wireless communication channels 110, 112, and 114 are established dynamically between user equipment 104, 106, and 108 and individual nodes 116, 118, and 120 of wireless network 102. Channels 110, 112, and 114 may be established, for example, at the time that a call to or from one of user equipment 104, 106, and 108 is initiated. Certain characteristics of communication channels 110, 112, and 114 are established at call set-up. For example, such characteristics may include the codec that is to be employed by the communication channel 110, 112, or 114 during the call. For example, the codec to be used may be selected based on factors such as the signal strength or signal quality between user equipment 104, 106, and 108 and a corresponding one of nodes 116, 118, or 120 of network 102 at call set-up. Although only three nodes 116, 118, and 120 are shown by example in FIG. 1, wireless network 102 may include many more such nodes.

Network 102 operates to transfer data packets between user equipment 104, 106, and 108 using network nodes 116, 118, and 120. Network 102 also may operate to transfer data packets between user equipment 104, 106, and 108 and other networks, such as conventional public switched telephone network (PSTN) 122, or other public or private networks 124, such as the Internet. This transfer of data packets to and from other networks 122 and 124 also uses network nodes 116, 118, and 120. As data packet traffic through one or more of nodes 116, 118, and 120 increases, the capacity of network 102 to process and transfer packets in a timely manner to and from user equipment 104, 106, and 108 may be exceeded. In this case, network 102, or one or more network nodes 116, 118, or 120, is said to be congested. The embodiments disclosed herein provide an improved system and method for responding intelligently and more effectively when such network congestion occurs.

Figure 2:
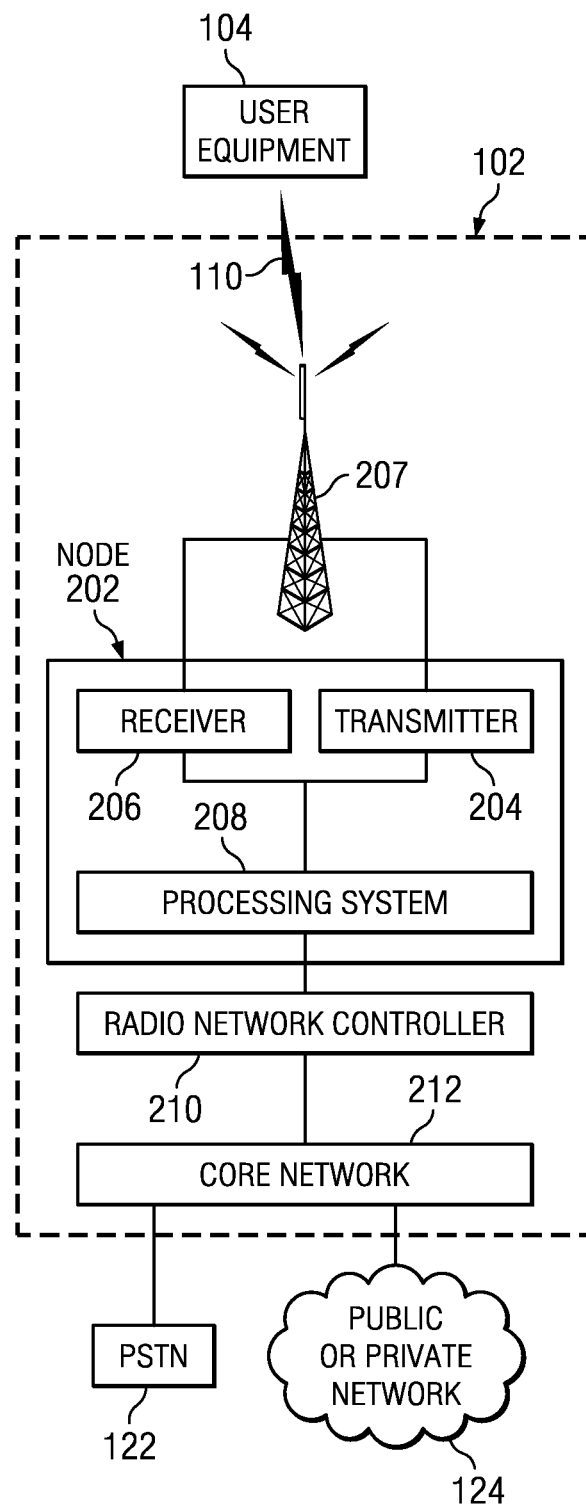
FIG. 2 is a block diagram of a wireless network in accordance with an illustrative embodiment.

Referring now to FIG. 2, a block diagram of an implementation of wireless network 102 in which illustrative embodiments may be implemented is presented. Wireless network 102 may be, for example, a Universal Mobile Telecommunications System (UMTS) Terrestrial Radio Access Network (UTRAN). However, illustrative embodiments may be implemented in other similar or different communication networks, such as wireless networks using Long Term Evolution (LTE) technology. Illustrative embodiments also may be implemented in wireless networks configured in accordance with General Packet Radio Service (GPRS) and Global Systems for Mobile (GSM) technologies.

Wireless network 102 includes node 202. In this example, node 202 is an example of one of nodes 116, 118, or 120 of FIG. 1. As mentioned above, in practice, wireless network 102 comprises one or more of nodes 202. For example, node 202 may be implemented as a Node B in a UMTS Terrestrial Radio Access Network or as the evolved Node B (eNodeB) in a Long Term Evolution network.

Node 202 may be referred to as a base transceiver station. Node 202 includes one or more radio frequency transmitters 204 and receivers 206 coupled to one or more antennas 207. Transmitters 204 and receivers 206 are used by node 202 to communicate directly with mobile devices, such as user equipment 104, via wireless communication channel 110. Node 202 provides wireless network coverage for a particular coverage area, commonly referred to as a "cell". Node 202 also includes one or more processing systems 208, such as computer data processing systems, for implementing the functionality provided by node 202.

Node 202 is coupled to, and controlled by, radio network controller 210. Multiple nodes 202 may be coupled to radio network controller 210 in network 102 in accordance with an illustrative embodiment. Radio network controller 210 is responsible for controlling all nodes 202 that are connected to it. Radio network controller 210 carries out radio resource management, such as the management of radio channels and some mobility management functions. Radio network controller 210 may be the point where encryption is done before user data is sent to and from user equipment 104.

Radio network controller 210 connects to core network 212. Multiple radio network controllers 210 may be coupled to core network 212. A main function of core network 212 is to provide for the routing of data packets between user equipment on network 102 and between user equipment on network 102 and users on other networks, such as public switched telephone network 122 and other public or private networks 124, such as the Internet. Functions provided by core network 212 in a UMTS network may be implemented, for example, by a media gateway and a Serving General Packet Radio Service (GPRS) Support Node (SGSN). A media gateway is a translation device or service that converts digital media streams between disparate telecommunications networks. Media gateways enable multimedia communications across networks over multiple transport protocols, such as Asynchronous Transfer Mode (ATM) and Internet Protocol (IP). An SGSN is responsible for the delivery of data packets from and to mobile user equipment within its geographical service area. Its tasks may include packet routing and transfer, mobility management, logical link management, and authentication and charging functions. In a Long Term Evolution (LTE) network, similar functions may be provided in core network 212 by, for example, a mobility management entity (MME), a serving gateway (SGW) and a packet data network (PDN) gateway (PGW).

The list of components presented with respect to FIG. 2 is not meant to be an exhaustive list of the components of a wireless network, but rather a list of components that are commonly used in communications through wireless network 102.

User equipment 104 is a two-way communication device with advanced data communication capabilities, including the capability to communicate with other user equipment or computer systems through a network of transceiver stations or nodes as described above. User equipment 104 may also have the capability to allow voice communication. Depending on the functionality provided by user equipment 104, it may be referred to as a data messaging device, a two-way pager, a cellular telephone with data messaging capabilities, a wireless Internet appliance, or a data communication device, with or without telephony capabilities.

Figure 3:
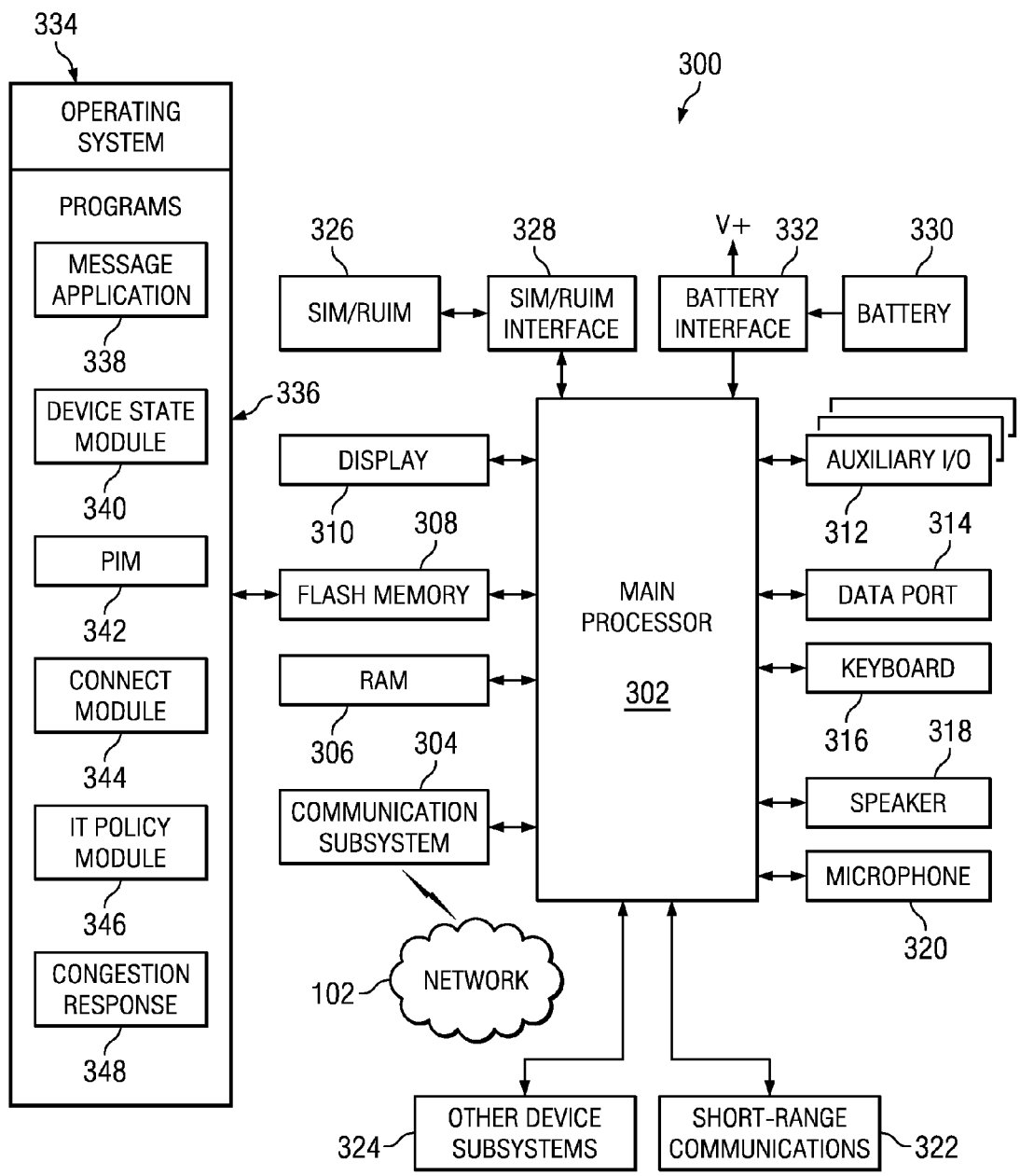
FIG. 3 is a block diagram of an embodiment of user equipment in accordance with an illustrative embodiment.

Shown in FIG. 3 is a block diagram of an illustrative embodiment of user equipment 300. In this example, user equipment 300 is an example of user equipment 104 in FIG. 1 and FIG. 2. User equipment 300 includes a number of components such as main processor 302 that controls the overall operation of user equipment 300. Communication functions, including data and voice communications, are performed through communication subsystem 304. Communication subsystem 304 receives messages from and sends messages to wireless network 102, described above. In this illustrative embodiment of user equipment 300, communication subsystem 304 may be configured in accordance with Universal Mobile Telecommunications System (UMTS) technology using the UMTS Terrestrial Radio Access Network (UTRAN) or Long Term Evolution (LTE) technology using Evolved UTRAN (E-UTRAN). Alternatively, communication subsystem 304 may be configured in accordance with the Global System for Mobile Communication (GSM) and General Packet Radio Services (GPRS) standards. New standards are still being defined, but it is believed that they will have similarities to the network behavior described herein, and it will also be understood by persons skilled in the art that the embodiments described herein are intended to use any other suitable standards that are developed in the future.

The wireless link connecting communication subsystem 304 with wireless network 102 represents one or more different radio frequency (RF) channels, operating according to defined protocols specified for the particular communication technologies being employed. With newer network protocols, these channels are capable of supporting both circuit switched voice communications and packet switched data communications.

Other wireless networks also may be associated with user equipment 300 in various implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, as mentioned above, third-generation (3G) networks like EDGE and UMTS, and Long Term Evolution (LTE) networks. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

Main processor 302 interacts with additional subsystems, such as random access memory (RAM) 306, flash memory 308, display 310, auxiliary input/output (I/O) subsystem 312, data port 314, keyboard 316, speaker 318, microphone 320, short-range communications 322, and other device subsystems 324.

Some of the subsystems of user equipment 300 perform communication-related functions, whereas other subsystems may provide "resident" or on-device functions. By way of example, display 310 and keyboard 316 may be used for both communication-related functions, such as entering a text message for transmission over network 102, and device-resident functions, such as a calculator or task list.

User equipment 300 can send and receive communication signals over wireless network 102 after required network registration or activation procedures have been completed. Network access is associated with a subscriber or user of user equipment 300. To identify a subscriber, user equipment 300 requires a Subscriber Identity Module (SIM) or a Removable User Identity Module (RUIM) card 326 to be inserted into SIM/RUIM interface 328 in order to communicate with a network. SIM or RUIM card 326 is one type of a conventional "smart card" that can be used to identify a subscriber of user equipment 300 and to personalize user equipment 300, among other things. SIM or RUIM card 326 includes a processor and memory for storing information.

Without card 326, user equipment 300 is not fully operational for communication with wireless network 102. By inserting SIM or RUIM card 326 into SIM/RUIM interface 328, a subscriber can access all subscribed services. Services may include web browsing and messaging such as e-mail, voice mail, Short Message Service (SMS), and Multimedia Messaging Services (MMS). More advanced services may include point of sale, field service and sales force automation. Once SIM or RUIM card 326 is inserted into SIM/RUIM interface 328, it is coupled to main processor 302. In order to identify the subscriber, SIM or RUIM card 326 can include user parameters, such as an International Mobile Subscriber Identity (IMSI). An advantage of using SIM or RUIM card 326 is that a subscriber is not necessarily bound by any single physical user equipment. SIM or RUIM card 326 may store additional subscriber information for user equipment as well, including datebook or calendar information and recent call information. Alternatively, user identification information can also be programmed into flash memory 308.

User equipment 300 is a battery-powered device and includes battery interface 332 for receiving one or more rechargeable batteries 330. In at least some embodiments, battery 330 may be a smart battery with an embedded microprocessor. Battery interface 332 is coupled to a regulator (not shown), which assists battery 330 in providing power V+ to user equipment 300. Although current technology makes use of battery 330, future technologies, such as micro fuel cells, may provide the power to user equipment 300.

User equipment 300 also includes operating system 334 and other programs 336. Programs 336 are described in more detail below. Operating system 334 and programs 336 may be implemented as software components that are run by main processor 302. Operating system 334 and programs 336 typically are stored as program code on a media readable by a processor, such as main processor 302. Such readable storage media may include a persistent storage device, such as flash memory 308, which may alternatively be a read-only memory (ROM) or similar storage element. Those skilled in the art will appreciate that portions of operating system 334 and programs 336, such as specific device applications, or parts thereof, may be loaded temporarily into a volatile storage device, such as RAM 306. Other software components also may be included, as is well known to those skilled in the art.

Programs 336 that control basic device operations, including data and voice communication applications, normally will be installed on user equipment 300 during its manufacture. Other programs 336 include message application 338. Message application 338 can be any suitable software program that allows a user of user equipment 300 to send and receive electronic messages. Various alternatives exist for message application 338, as is well known to those skilled in the art. Messages that have been sent or received by the user are typically stored in flash memory 308 of user equipment 300, or some other suitable storage element in user equipment 300. In at least some embodiments, some of the sent and received messages may be stored remotely from user equipment 300, such as in a data store of an associated host system that user equipment 300 communicates with.

Programs 336 may further include device state module 340, personal information manager (PIM) 342, and other suitable modules. Device state module 340 provides persistence, i.e., device state module 340 ensures that important device data is stored in persistent memory, such as flash memory 308, so that the data is not lost when user equipment 300 is turned off or loses power.

PIM 342 includes functionality for organizing and managing data items of interest to the user, such as, but not limited to, e-mail, contacts, calendar events, voice mails, appointments, and task items. A PIM application has the ability to send and receive data items via wireless network 102. PIM data items may be seamlessly integrated, synchronized, and updated via wireless network 102 with the user equipment subscriber's corresponding data items stored or associated with a host computer system. This functionality creates a mirrored host computer on user equipment 300 with respect to such items. This can be particularly advantageous when the host computer system is the user equipment subscriber's office computer system.

User equipment 300 also includes connect module 344, and IT policy module 346. Connect module 344 implements the communication protocols that are required for user equipment 300 to communicate with the wireless infrastructure and any host system, such as an enterprise system, that user equipment 300 is authorized to interface with.

Connect module 344 includes a set of APIs that can be integrated with user equipment 300 to allow user equipment 300 to use any number of services associated with an enterprise system. Connect module 344 allows user equipment 100 to establish an end-to-end secure, authenticated communication pipe with the host system. A subset of applications for which access is provided by connect module 344 can be used to pass IT policy commands from the host system to user equipment 300. This can be done in a wireless or wired manner. These instructions can then be passed to IT policy module 346 to modify the configuration of user equipment 300. Alternatively, in some cases, the IT policy update can also be done over a wired connection.

IT policy module 346 receives IT policy data that encodes the IT policy. IT policy module 346 then ensures that the IT policy data is authenticated by user equipment 300. The IT policy data can then be stored in flash memory 306 in its native form. After IT policy data is stored, a global notification can be sent by IT policy module 346 to all of the applications residing on user equipment 300. Applications for which the IT policy may be applicable then respond by reading the IT policy data to look for IT policy rules that are applicable. After the IT policy rules have been applied to the applicable applications or configuration files, IT policy module 346 sends an acknowledgement back to the host system to indicate that the IT policy data was received and successfully applied.

In accordance with a disclosed embodiment, congestion response module 348 may be provided to adapt the bitrate of user equipment 300 in response to receiving packets marked "Congestion Experienced" or unmarked packets, using one or more rate adaptation sequences provided by network 102 or configured on user equipment 300, as will be described in more detail below. Congestion response module 348 may include one or more stand alone modules, or may be implemented, in whole or in part, as part of another module, such as connect module 344.

Other types of programs or software applications also may be installed on user equipment 300. These software applications may be third party applications, which are added after the manufacture of user equipment 300. Examples of third party applications include games, calculators, utilities, etc.

Additional applications can be loaded onto user equipment 300 through at least one of wireless network 102, auxiliary I/O subsystem 312, data port 314, short-range communications subsystem 322, or any other suitable device subsystem 324. This flexibility in application installation increases the functionality of user equipment 300 and may provide enhanced on-device functions, communication-related functions, or both. For example, secure communication applications may enable electronic commerce functions and other such financial transactions to be performed using user equipment 300.

Data port 314 enables a subscriber to set preferences through an external device or software application and extends the capabilities of user equipment 300 by providing for information or software downloads to user equipment 300 other than through a wireless communication network. The alternate download path may, for example, be used to load an encryption key onto user equipment 300 through a direct and thus reliable and trusted connection to provide secure device communication.

Data port 314 can be any suitable port that enables data communication between user equipment 300 and another computing device. Data port 314 can be a serial or a parallel port. In some instances, data port 314 can be a USB port that includes data lines for data transfer and a supply line that can provide a charging current to charge battery 330 of user equipment 300.

Short-range communications subsystem 322 provides for communication between user equipment 300 and different systems or devices, without the use of wireless network 102. For example, subsystem 322 may include an infrared device and associated circuits and components for short-range communication. Examples of short-range communication standards include standards developed by the Infrared Data Association (IrDA), Bluetooth, and the 802.11 family of standards developed by IEEE.

In use, a received signal, such as a text message, an e-mail message, or web page download, will be processed by communication subsystem 304 and input to main processor 302. Main processor 302 will then process the received signal for output to display 310 or alternatively to auxiliary I/O subsystem 312. A subscriber may also compose data items, such as e-mail messages, for example, using keyboard 316 in conjunction with display 310 and possibly auxiliary I/O subsystem 312. Auxiliary subsystem 312 may include devices such as a touch screen, mouse, track ball, infrared fingerprint detector, or a roller wheel with dynamic button pressing capability. Keyboard 316 preferably is an alphanumeric keyboard or telephone-type keypad. However, other types of keyboards also may be used. A composed item may be transmitted over wireless network 102 through communication subsystem 304.

For voice communications, the overall operation of user equipment 300 is substantially similar, except that the received signals are output to speaker 318, and signals for transmission are generated by microphone 320. Alternative voice or audio I/O subsystems, such as a voice message recording subsystem, can also be implemented on user equipment 300. Although voice or audio signal output is accomplished primarily through speaker 318, display 310 can also be used to provide additional information, such as the identity of a calling party, duration of a voice call, or other voice call related information.

Figure 4:
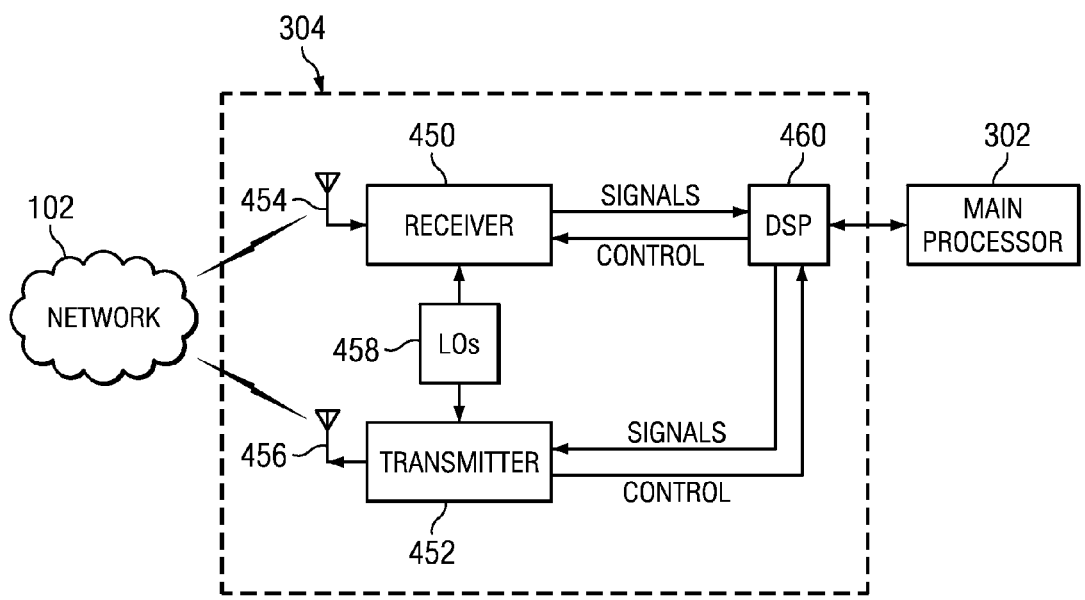
FIG. 4 is a block diagram of an embodiment of a communication subsystem component of the user equipment in FIG. 3.

Referring now to FIG. 4, a block diagram of communication subsystem component 304 of user equipment 300 of FIG. 3 is shown. Communication subsystem 304 includes receiver 450 and transmitter 452, as well as associated components, such as one or more embedded or internal antenna elements 454 and 456, local oscillators (LOs) 458, and a processing module, such as a digital signal processor (DSP) 460. The particular design of communication subsystem 304 is dependent upon the communication network 102 with which user equipment 300 is intended to operate. Thus, it should be understood that the design illustrated in FIG. 4 serves only as one example.

Signals received by antenna 454 through wireless network 102 are input to receiver 450, which may perform such common receiver functions as signal amplification, frequency down conversion, filtering, channel selection, and analog-to-digital (A/D) conversion. A/D conversion of a received signal allows more complex communication functions, such as demodulation and decoding, to be performed in DSP 460. In a similar manner, signals to be transmitted are processed, including modulation and encoding, by DSP 460. These DSP-processed signals are input to transmitter 452 for digital-to-analog (D/A) conversion, frequency up conversion, filtering, amplification and transmission over wireless network 102 via antenna 456. DSP 460 not only processes communication signals, but also provides for receiver and transmitter control. For example, gains applied to communication signals in receiver 450 and transmitter 452 may be adaptively controlled through automatic gain control algorithms implemented in DSP 460.

The wireless link between user equipment 300 and wireless network 102 can contain one or more different channels, typically different RF channels, and associated protocols used between user equipment 300 and wireless network 102. An RF channel is a limited resource that must be conserved, typically due to limits in overall bandwidth and limited battery power of user equipment 300.

When user equipment 300 is fully operational, transmitter 452 typically is keyed or turned on only when it is transmitting to wireless network 102 and is otherwise turned off to conserve resources. Similarly, receiver 450 is periodically turned off to conserve power until it is needed to receive signals or information during designated time periods.

One or more of the disclosed embodiments may be applied to types of communications and standards other than those described above with respect to FIGS. 1-4. For example, without limitation, the different illustrative embodiments may be implemented using LTE Advanced. Additionally, the wireless networks illustrated may take the form of or include 4G networks.

Figure 5:
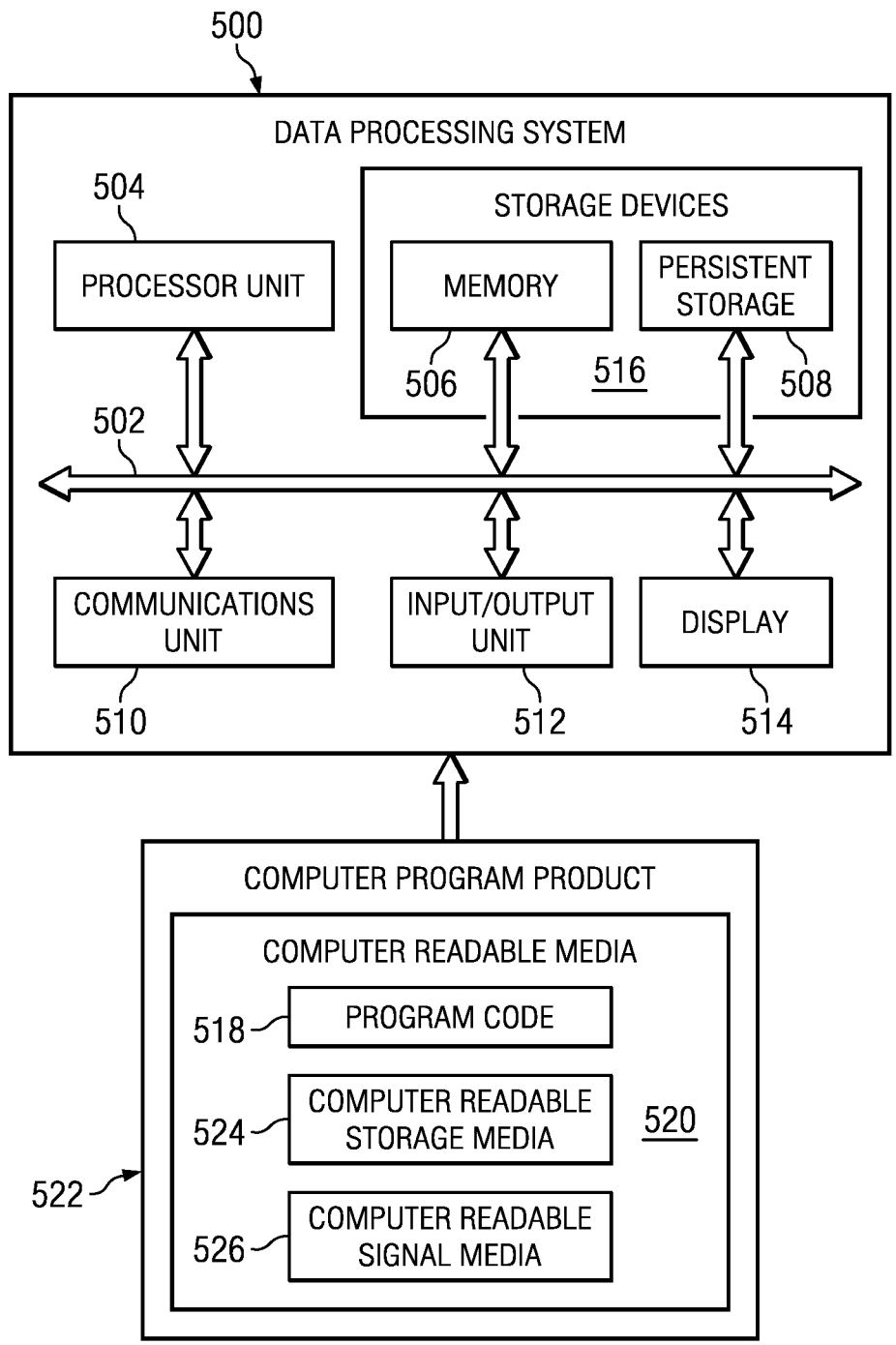
FIG. 5 is a block diagram of a data processing system depicted in accordance with an illustrative embodiment.

Turning now to FIG. 5, a diagram of data processing system 500 is depicted in accordance with an illustrative embodiment. In this example, data processing system 500 is an example of one implementation of processing system 208 in node 202 in FIG. 2. Data processing system 500, or portions thereof, also may be used to implement one or more functions of user equipment 300 as illustrated in FIG. 3. In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a set of one or more processors or may be a multi-processor core, depending on the particular implementation. Further, processor unit 504 may be implemented using one or more heterogeneous processor systems, in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Memory 506, in these examples, may be, for example, a random access memory, or any other suitable volatile or non-volatile storage device. Persistent storage 508 may take various forms, depending on the particular implementation. For example, persistent storage 508 may contain one or more components or devices. For example, persistent storage 508 may be a hard drive, a flash memory, a rewritable optical disk, a rewritable magnetic tape, or some combination of the above. The media used by persistent storage 508 may be removable. For example, a removable hard drive may be used for persistent storage 508.

Communications unit 510, in these examples, provides for communication with other data processing systems or devices. In these examples, communications unit 510 is a network interface card. Communications unit 510 may provide communications through the use of either or both physical and wireless communications links.

Input/output unit 512 allows for the input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 in order to be run by processor unit 504. The processes of the different embodiments may be performed by processor unit 504 using computer implemented instructions, which may be located in a memory, such as memory 506.

These instructions are referred to as program code, computer usable program code, or computer readable program code that may be read and run by a processor in processor unit 504. The program code, in the different embodiments, may be embodied on different physical or computer readable storage media, such as memory 506 or persistent storage 508.

Program code 518 is located in a functional form on computer readable media 520 that is selectively removable and may be loaded onto or transferred to data processing system 500 to be run by processor unit 504. Program code 518 and computer readable media 520 form computer program product 522. In one example, computer readable media 520 may be computer readable storage media 524 or computer readable signal media 526. Computer readable storage media 524 may include, for example, an optical or magnetic disc that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory that is connected to data processing system 500. In some instances, computer readable storage media 524 may not be removable from data processing system 500.

Alternatively, program code 518 may be transferred to data processing system 500 using computer readable signal media 526. Computer readable signal media 526 may be, for example, a propagated data signal containing program code 518. For example, computer readable signal media 526 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer readable signal media 526 for use within data processing system 500. For instance, program code stored in a computer readable storage media in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different embodiments may be implemented using any hardware device or system capable of executing program code. As one example, data processing system 500 may include organic components integrated with inorganic components and/or may be comprised entirely of organic components excluding a human being. For example, a storage device may be comprised of an organic semiconductor.

As another example, a storage device in data processing system 500 is any hardware apparatus that may store data. Memory 506, persistent storage 508, and computer readable media 520 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, communications unit 510 may include one or more devices used to transmit and receive data, such as a modem or a network adapter. Further, a memory may be, for example, memory 506 or a cache such as found in an interface and memory controller hub that may be present in communications fabric 502.

The illustrations of hardware components in FIGS. 1-5 are not meant to imply physical or architectural limitations to the manner in which different illustrative embodiments may be implemented. Other components in addition to or in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 6:
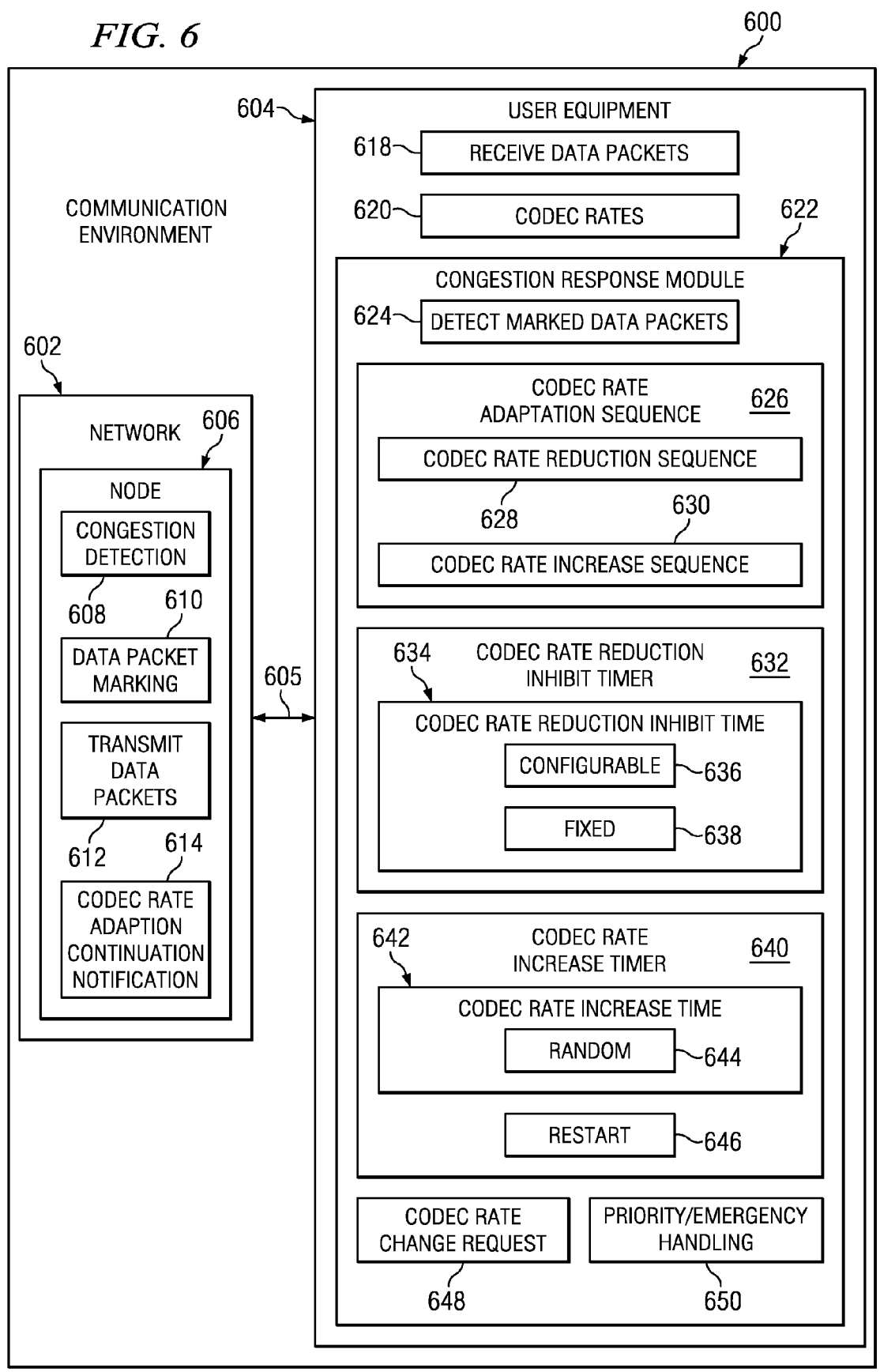
FIG. 6 is a block diagram illustrating a communication environment in accordance with an illustrative embodiment.

Turning now to FIG. 6, a block diagram illustrating communication environment 600 is depicted in accordance with an illustrative embodiment. Communication network 100 of FIG. 1 is an example of one implementation of communication environment 600 of FIG. 6. Communication environment 600 includes one or more networks 602 in association with user equipment 604. Wireless network 102 in FIG. 1 is an example of one implementation of network 602 in FIG. 6. User equipment 104 in FIG. 1 and user equipment 300 in FIG. 3 are examples of user equipment 604 in FIG. 6. As discussed above, user equipment 604 may include a variety of devices, such as mobile wireless communication devices including pagers, cellular phones, cellular smart-phones, wireless organizers, personal digital assistants, computers, laptops, handheld wireless communication devices, wirelessly enabled notebook computers and the like. In operation, user equipment 604 is in communication with network 602 via wireless communication channel 605 in the manner described above. Thus, network 602 and user equipment 604 exchange data packets via wireless channel 605.

Network 602 includes one or more network nodes 606. Wireless network node 202 of FIG. 2 is one example of node 606 of FIG. 6. Node 606 may comprise a base transceiver station, as described above. Generically, node 606 may include any equipment, device, group of devices, or functionality that sends, receives, or otherwise processes data packets as they pass through network 602. Thus, node 606 may itself comprise user equipment, as described above, which is a part of or in communication with network 602.

In accordance with an illustrative embodiment, node 606 includes a module for performing a function of congestion detection 608. Any system or method currently known, or which becomes known, for detecting congestion on network 602 may be employed to implement this function. Congestion detection 608 preferably may include continually estimating a level of congestion at node 606 or at any other location in network 602 that may affect processing by network 602 of data packets to be delivered to or received from user equipment 604. Congestion may be considered detected when a current level of congestion is greater than a selected threshold. Congestion is not detected when the current level of congestion is less than selected threshold.

The congestion estimate within node 606, or another network element, may be a combined measure with many different measurements as inputs, such as one or more of radio related measurements of signal power, interference, or other radio related measurements, as well as other measurements, such as the amount of queued data to be processed in node 606, queuing delays, or other measurements. Modifications to the congestion estimation, or to the determination of whether or not congestion is considered detected, may be used. Such modifications may include one or more of filtering of the congestion estimate, application of hysteresis at the congestion threshold, or other modifications. The congestion estimation method and the selected threshold employed for congestion detection 608 may vary depending on the specific network node 606 or other element in which congestion detection 608 is implemented or for which congestion is to be determined.

In accordance with an illustrative embodiment, network node 606 includes a module for performing a function of data packet marking 610. Data packet marking 610 includes marking data packets to be transmitted to user equipment 604. Data packets are marked with a marker indicating "Congestion Experienced" if congestion is considered detected. Data packets are not marked if congestion is not detected.

Packet marking indicating "Congestion Experienced" may include the use of markings currently used or as proposed for Explicit Congestion Notification. Such marking includes marking two bits in the Internet Protocol (IP) header of a packet as '11'. Marking a packet "Congestion Experienced" in accordance with an illustrative embodiment may employ other marking schemes, dependent upon the types of data and packets to be transmitted, and may include marking in the header and/or in other portions of a data packet.

Node 606 includes structures and functionality to transmit data packets 612, including marked and unmarked packets, via wireless communication channel 605, to user equipment 604 in a normal manner. Similarly, user equipment 604 includes structures and functionality to receive the data packets 618 transmitted from network 602 in a normal manner.

In accordance with an illustrative embodiment, transmissions of data packets between network 602 and user equipment 604 may be at one or more adaptable codec rates 620. In accordance with an illustrative embodiment, a sender, such as node 606, and a receiver, such as user equipment 604, are built or adapted and configured to support multiple codec rates 620. Multiple codec rates 620 also may be referred to as a mode set. Examples of multiple codec rates 620 include the Adaptive MultiRate codec rates of 4.75 kbps, 7.4 kbps, 12.2 kbps, etc.

In accordance with an illustrative embodiment, user equipment 604 includes congestion response module 622. Functions of congestion response module 622 may be implemented in software, firmware, or the like, such as in software running on the main processor or another processor provided in user equipment 604. Functions of congestion response module 622 include functions to detect marked data packets 624 received by user equipment 604 and functions to implement codec rate adaptation sequences 626 in response to detected marked and unmarked data packets received by user equipment 604. As will be discussed in more detail below, codec rate adaptation sequences 626 may include codec rate reduction sequence 628 and codec rate increase sequence 630.

In accordance with an illustrative embodiment, when there is no congestion, and absent any constraints unrelated to Explicit Congestion Notification, the highest codec rate in a mode set established between a sender and receiver is assumed to be used by the sender. When the receiver, such as user equipment 604, receives packets marked "Congestion Experienced", indicating congestion in network 602, the receiver decides to which lower rate codec in the mode set to adapt to. This rate adaptation in response to congestion is defined by codec rate reduction sequence 628. When congestion is cleared, unmarked data packets will be received and detected by the receiver. If one or more higher codec rates are available, the receiver decides to which higher rate codec to adapt to, or to remain at the current codec rate. This rate adaptation in response to clearing congestion is defined by codec rate increase sequence 630.

Codec rate adaptation sequences 626, including codec rate reduction sequence 628 and codec rate increase sequence 630, may include system level configuration parameters that are provided by network 602. Network provided codec rate adaptation sequences 626 may be static or dynamic. For example, codec rate adaptation sequence 626 parameters may be stored statically in a Home Subscriber System (HSS) as part of network 602. Alternatively, codec rate adaptation sequence 626 parameters may be determined dynamically at a packet data network (PDN) gateway (PGW) on network 602, for example, according to expected congestion and handling requirements and capacity. Codec rate adaptation sequences 626 from network 602 may be stored in network sender and receiver endpoints, such as user equipment 604, as known parameters for a given user equipment 604. Codec rate adaptation sequences 626 may be sent to the endpoints on attach or Tracking Area Update (TAU)/Routing Area Update (RAU)/Location Area Update (LAU) responses. For static codec rate adaptation sequences 626, sequence parameters may be sent to the endpoints just once for a call or for multiple calls. Codec rate adaptation sequence 626 parameters may be delivered from network 602 to a receiving terminal, such as user equipment 604, via system messages. For example, codec rate adaptation sequence 626 parameters may be delivered to user equipment 604 using user equipment attachment, user equipment service request, and handover procedures.

As an alternative to, or in addition to, rate adaptation sequences 626 provided by network 602, endpoint senders and receivers, such as user equipment 604, may be configured with preferred codec rate adaptation sequences 626. In this case, the endpoints may adapt the codec rates according to the configuration in the manner described herein. If a receiver, such as user equipment 604, with configured codec rate adaptation sequences 626 also receives codec rate adaptation sequences 626 from network 602, an operational determination may be made to determine which of the two codec rate adaptation sequences 626, from network 602 or configured on receiver 604, will take precedence. In this case, network 602 may inform receiver 604 of the precedence or the precedence may be configured on receiver 604. One or more of the codec rate adaptation sequences 626 or the precedence information configured on receiver 604 may be provided by an Open Mobile Alliance (OMA) Device Management (DM) object under operational policy.

If a codec rate adaptation sequence 626, such as codec rate reduction sequence 628 or codec rate increase sequence 630, is not specified by network 602 or configured on user equipment 604, a default codec rate adaptation sequence 626 may be used. The default codec rate adaptation sequence 626 may follow the order of the codec rates in the codec set negotiated between user equipment 604 and network 602 at call setup. For example, if the negotiated codec rate set is (4.75 kbps, 7.4 kbps, 12.2 kbps), then the default codec rate reduction sequence 628 may be (12.2 kbps, 7.4 kbps, 4.75 kbps) and the default codec rate increase sequence 630 may be (4.75 kbps, 7.4 kbps, 12.2 kbps).

Codec rate parameter values for the codec rate adaptation sequences 626 may be indicated as scalar values. For example, codec rate adaptation sequence 626 rate parameter values 1, 2, and 3 may indicate corresponding mode set bitrates of 4.75 kbps, 7.4 kbps, and 12.2 kbps, respectively. Optionally, codec rate adaptation sequence 626 may indicate real codec rates for adaptation directly.

Codec rate reduction sequence 628 and codec rate increase sequence 630 may use the same set of rates for their respective rate adaptation sequences, but in a reverse direction or order. For example, if codec rate increase sequence 630 uses the sequence (4.75 kbps, 7.4 kbps, 12.2 kbps) for increasing the codec rate in response to congestion clearing, then codec rate reduction sequence 628 may use the sequence (12.2 kbps, 7.4 kbps, 4.75 kbps) for decreasing the codec rate in response to congestion detection.

Alternatively, two different sets of rates may be configured for the codec rate reduction sequence 628 and for the codec rate increase sequence 630, one set of rates for reducing the codec rate in response to detecting congestion and a different set of codec rates for increasing the codec rate in response to congestion clearing. For example, the codec rate reduction sequence 628 might be (12.2 kbps, 4.75 kbps) with the codec rate increase sequence 630 being (4.75 kbps, 7.4 kbps, 12.2 kbps). In this example, when congestion is detected, the rate steps down in one step from 12.2 kbps to 4.75 kbps. However, when congestion is cleared, the codec rate steps up in two steps, from 4.75 kbps to 7.4 kbps and from 7.5 kbps to 12.2 kbps.

In accordance with an illustrative embodiment, if a data packet marked "Congestion Experienced" is received by a receiving terminal, such as by user equipment 604, then the codec rate is reduced by one step within the set of the negotiated or specified codec rates or one step according to codec rate reduction sequence 628. Codec rate reduction may be implemented by user equipment 604 by generating and sending to node 606 an appropriate codec rate change request 648. At this point, codec rate reduction inhibit timer 632, provided in user equipment 604, is started. While codec rate reduction inhibit timer 632 is running, the codec rate will not be reduced further, even if another marked data packet is received during this time.

The length of time that codec rate reduction inhibit timer 632 runs after being started is referred to herein as codec rate reduction inhibit time 634. Codec rate reduction inhibit time 634 preferably should be set to a value that is longer than the round trip time between the two endpoints in communication, such as between node 606 and user equipment 604, plus some additional observation time. Setting of rate reduction inhibit time 634 thus should allow sufficient time for the receiver to request the reduced codec rate from the sender, for the sender to switch to the reduced rate, and then for the network element, such as node 606, that was experiencing congestion and marking data packets "Congestion Experienced" to observe that congestion has been cleared and to stop marking packets. Any appropriate or desired length of time may be used for codec rate reduction inhibit time 634 in accordance with illustrative embodiments. In accordance with illustrative embodiments, codec rate reduction inhibit time 634 may be configurable 636 or fixed 638. Codec rate reduction inhibit time 634 may be dynamically provided by network 602, such as via a Non Access Stratum (NAS) or a call setup message.

If a rate reduction does not relieve congestion on network 602, node 606 may continue to mark data packets in order to trigger a further reduction in the codec rate. If the receiving terminal receives a data packet marked "Congestion Experienced" after the codec rate reduction inhibit timer 632 times out, the receiving terminal may initiate the next lower rate codec adaptation, such as in accordance with codec rate reduction sequence 628, if the current codec rate is not the lowest in the mode set.

If a congestion condition on network 602 has not improved for some time period after network 602 has triggered a codec rate reduction, by marking data packets "Congestion Experienced" to indicate to receivers to initiate codec rate reduction for congestion control, then network 602 may determine that it is necessary to notify the receivers of the need for continued codec rate reduction. Network 602 may notify receivers, such as user equipment 604, of the need for continued codec rate reduction to reduce network congestion by sending specific notifications on codec rate adaptation continuation to the receivers. Thus, in accordance with an illustrative embodiment, node 606 may include a module or function for providing codec rate adaptation continuation notification 614.

Upon receiving a codec rate adaptation continuation notification, a receiver, such as user equipment 604, may adapt to the next lower rate codec rate, if the current codec rate is not the lowest one. In certain special situations, such as when network 602 is heavily congested, the codec rate adaptation continuation notification may notify the receiver to initiate immediately the lowest codec rate. Thus, a codec rate adaptation continuation notification message sent by network 602, such as by node 606, for example, via broadcasting or specific message to network endpoints, such as user equipment 604, may include a codec rate adaptation continuation notification type indicator that may take on one of two values, to indicate either a codec rate adaptation to the next lower codec rate or a codec rate adaptation to the lowest codec rate.

Other than sending codec rate adaptation continuation notifications to receivers, such as user equipment 604, for the receivers to initiate continued codec rate reductions to senders, such as node 606, codec rate adaptation continuation notifications can be sent by network 602 to senders, such as node 606, directly. In this manner, senders may be notified directly to reduce the sending codec rate, without initiation from receivers. This may speed up congestion control in some cases.

In accordance with illustrative embodiments, use of codec rate adaptation continuation notifications to reduce congestion may be inclusive or exclusive with codec rate adaptation for congestion reduction using "Congestion Experienced" marking of data packets as described above. In cases where continued codec rate adaptation in accordance with illustrative embodiments is insufficient to clear a congestion condition, network 602 may employ other types of mechanisms for congestion control, such as dropping packets or services.

In accordance with an illustrative embodiment, when a codec rate is reduced in response to user equipment 604 receiving a data packet marked "Congestion Experienced", codec rate increase timer 640, provided in user equipment 604, may be started. Codec rate increase timer 640 is adapted to time codec rate increase time 642. Codec rate increase time 642 typically may be much longer than codec rate reduction inhibit time 634. For example, codec rate increase time 642 may be selected to be ten seconds or more. Any other appropriate or desired length of time may be used for codec rate increase time 642 in accordance with an illustrative embodiment. Using a longer time period for codec rate increase time 642 is preferable, because increasing the codec rate after congestion is cleared is much less critical than timely codec rate reduction for congestion control. Use of a longer codec rate increase time 642 can also reduce the potential for codec adaptation oscillation between codec rate reduction and increase. At least a portion of codec rate increase time 642 may be random 644. Use of a random element in codec rate increase time 642 also helps to prevent oscillation between codec rate reduction and increase that might result if many user devices supported by a network node simultaneously request codec rate increases as their individual codec rate increase times simultaneously expire.

In accordance with an illustrative embodiment, when codec rate increase timer 640 expires, the codec rate may be increased by one step within the set of negotiated codec rates or increased one step according to codec rate increase sequence 630. A codec rate increase may be implemented by user equipment 604 by generating and sending to node 606 an appropriate codec rate change request 648. When a data packet marked "Congestion Experienced" is received while codec rate increase timer 640 is running, then the receiver, such as user equipment 604, will reduce the codec rate, in the manner described above, and codec rate increase timer 640 will restart 646. In addition, codec rate increase timer 640 will restart 646 when codec rate increase timer 640 expires, in order to allow for the codec rate to increase again when codec rate increase timer 640 expires. In this manner, illustrative embodiments provide a mechanism whereby the codec rate can gradually step back up to its highest value, absent any other constraints.

In accordance with illustrative embodiments, codec rate reduction inhibit timer 632 and codec rate increase timer 640 may operate independently. Alternatively, codec rate increase timer 640 may not be reset 646 while codec rate reduction inhibit timer 632 is running. However, because codec rate reduction inhibit time 634 is likely to be very short in comparison to codec rate increase time 642, there is likely to be very little difference in performance between the two options.

In accordance with an alternative illustrative embodiment, data packets marked "Congestion Experienced" that are received by user equipment 604 may be ignored for purposes of restarting codec rate increase timer 640 while codec rate increase timer 640 is running. In this case, codec rate increase timer 640 is not restarted when marked packets are received while codec rate increase timer 640 is running. In this alternative embodiment, when codec rate increase timer 640 expires, user equipment 604 checks whether or not marked packets were received while codec rate increase timer 640 was running. If no marked packets were received while codec rate increase timer 640 was running, then the codec rate may be increased and codec rate increase timer 640 may be restarted. However, if marked packets were received while codec rate increase timer 640 was running, then codec rate increase timer 640 is restarted without increasing the codec rate. In this case, the next possible time when the codec rate can be increased is at the next expiration of codec rate increase timer 640. As compared with the approach of restarting codec rate increase timer 640 whenever marked packets are received while codec rate increase timer 640 is running, as described above, this alternative approach may be simpler. However, in cases where a marked packet is received just after codec rate increase timer 640 is started, and no other marked packets are received while codec rate increase timer 640 is running, this alternative approach has the effect of almost doubling the time to increase the codec rate, because user equipment 604 must wait for almost two entire codec rate increase time periods to expire before increasing the codec rate.

Explicit Congestion Notification based codec adaptation for congestion control as disclosed herein may not be desirable for priority users and priority or emergency services, except in catastrophic situations. Thus, in accordance with an illustrative embodiment, user equipment 604 may include appropriate functionality to provide for priority/emergency handling 650.

Emergency services usually are carried over emergency bearers, such as connections established with either an emergency attach or an emergency Public Data Network (PDN) connection establishment. Thus, network 602 may not enable Explicit Congestion Notification as described herein for emergency bearers and priority/emergency handling 650 for user equipment 604 may include knowing that codec rate adaptation as described herein will not be applied on emergency bearers.

In accordance with an illustrative embodiment, under normal operation, priority/emergency handling 650 provides that codec rate adaptation as described herein will not be applied to priority users and priority/emergency services. However, if a catastrophic condition occurs, massive numbers of simultaneous service requests, such as emergency calls, may be made to the system. In accordance with an illustrative embodiment, priority/emergency handling 650 may provide for applying codec rate adaptation as disclosed herein to such emergency calls if the number of such emergency calls exceeds a specific threshold number or the percentage of all calls that are emergency calls exceeds a threshold percentage. Handling of emergency calls when such catastrophic conditions occur may be realized by network 602 by marking data packets "Congestion Experienced" in the packet delivery for emergency services when a catastrophic condition occurs and otherwise not marking such data packets.

In accordance with an illustrative embodiment, priority/emergency handling 650 may provide that very high priority user equipment 604, by a very special user, need not implement codec rate reduction as described herein per policy control rule and/or authorization by the Home Public Land Mobile Network (HPLMN) operator. Very high priority user equipment may not be allowed to ignore codec rate reduction by a Visited Public Land Mobile Network (VPLMN) operator.

The illustration of FIG. 6 is not meant to imply physical or architectural limitations to the manner in which different embodiments may be implemented. Other components in addition and/or in place of the ones illustrated may be used. Some components may be unnecessary in some embodiments. Also, the blocks are presented to illustrate some functional components. One or more of these blocks may be combined and/or divided into different blocks when implemented in different advantageous embodiments.

Figure 7:
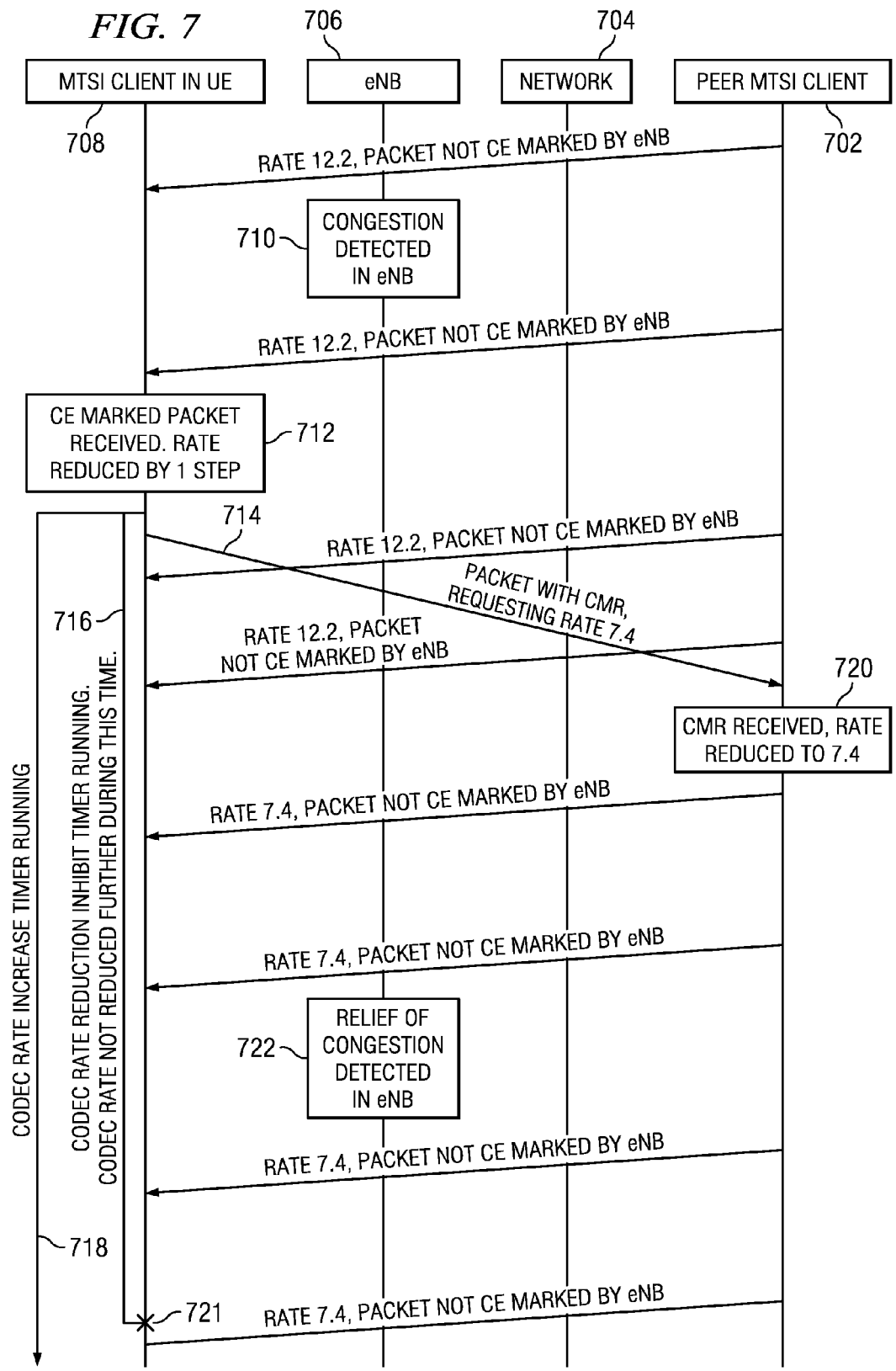
FIG. 7 illustrates an example of codec rate reduction in accordance with an illustrative embodiment.

An example of codec rate reduction in accordance with an illustrative embodiment is illustrated in FIG. 7. The example presented in FIG. 7 illustrates codec rate reduction in accordance with an illustrative embodiment when congestion in the downlink direction, from network to user equipment, is detected within a network node. Initially, data packets from a sender peer Multimedia Telephony Services for IP Multimedia Subsystem (MTSI) client 702 are delivered via network 704 and network node 706, such as an eNodeB network node, to an MTSI client in user equipment (UE) 708 at a rate of 12.2 kbps. Congestion is not initially experienced, so data packets are not marked "Congestion Experienced" (CE) by node 706. At some point in time, congestion is detected in the node 710. In response to detecting congestion, node 706 begins to mark data packets "Congestion Experienced". Such a marked packet is received by user equipment 708. In response to receiving a marked packet, user equipment 708 reduces the codec rate by one step 712. Codec rate reduction by user equipment 708 includes sending a packet with a Codec Mode Request (CMR) 714 requesting a rate change to 7.4 kbps back through node 706 and network 704 to client 702. At the same time as requesting the rate change, user equipment 708 starts codec rate reduction inhibit time 716 and codec rate increase time 718 running.

As congestion continues to be detected in node 706 data packets continue to be marked. However, as long as codec rate reduction inhibit time 716 is running, marked packets received by user equipment 708 do not result in further rate reductions. Eventually, the requested rate change is received by client 720, and the transmission rate is reduced to 7.4 kbps, as requested by user equipment 708. Packets continue to be marked by node 706 until, eventually, the reduced codec rate results in clearing the congestion in node 706. Node 706 detects this relief in congestion 722, and thus stops marking packets at this point. At the point in time where codec rate inhibit time 716 expires 721, the congestion has been cleared, packets are not being marked by node 706, and thus no further codec rate reduction is initiated by user equipment 708.

Figure 8:
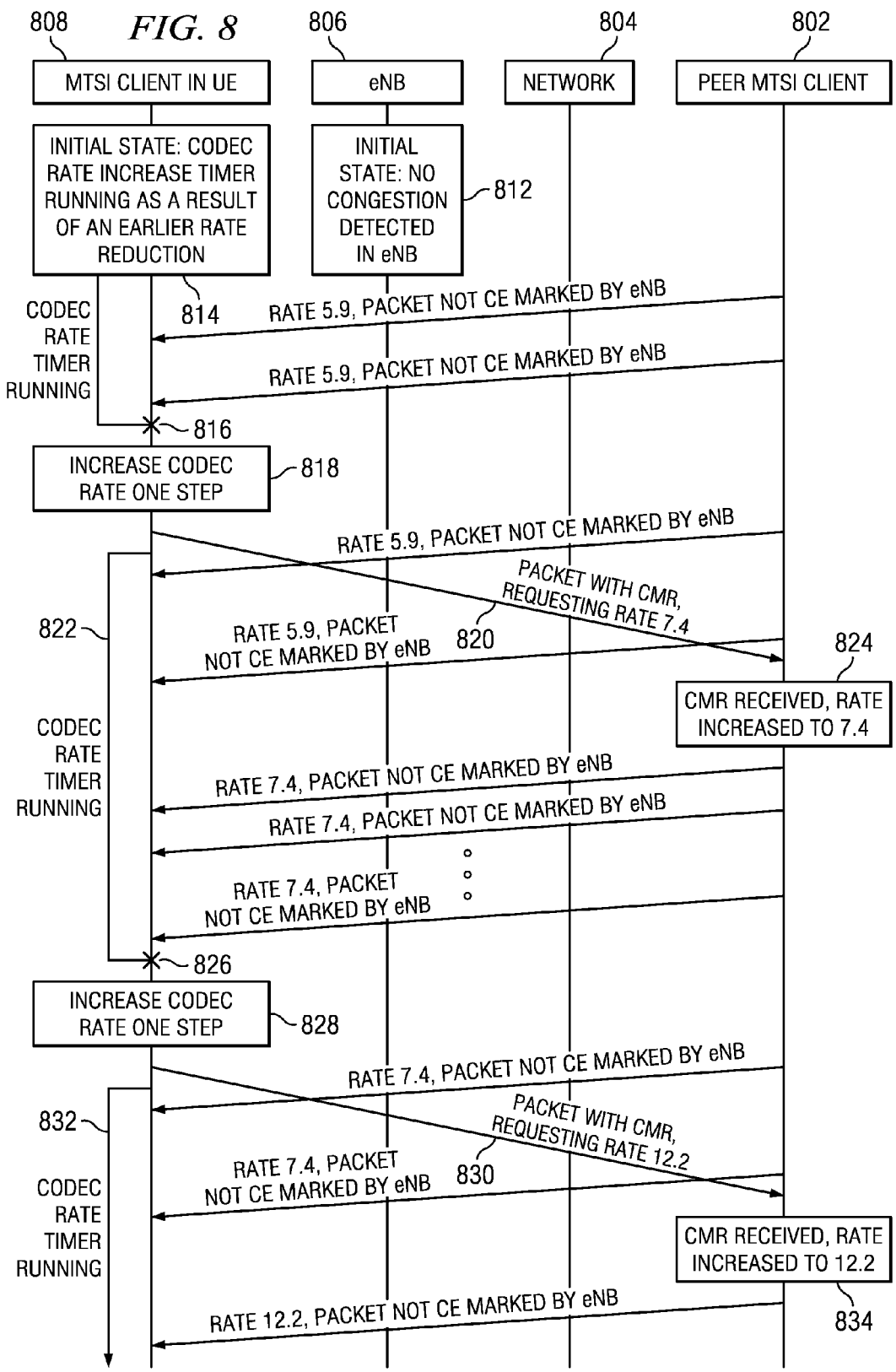
FIG. 8 illustrates an example of codec rate increase in accordance with an illustrative embodiment.

An example of codec rate increase in accordance with an illustrative embodiment is illustrated in FIG. 8. The example presented in FIG. 8 illustrates codec rate increase in accordance with an illustrative embodiment in the downlink direction, from network to user equipment, when there is no congestion detected within a network node. Initially, data packets from a sender peer Multimedia Telephony Services for IP Multimedia Subsystem (MTSI) client 802 are delivered via network 804 and network node 806, such as an eNodeB network node, to an MTSI client in user equipment (UE) 808 at a rate of 5.9 kbps. Congestion is not detected in node 812, so data packets are not marked "Congestion Experienced" (CE) by node 806. A codec rate increase timer is running as a result of an earlier rate reduction 814. As long as the codec rate increase timer is running, client 808 does not attempt to increase the codec rate, even though data packets received by client 808 are not marked, indicating no congestion.

Eventually, the codec rate increase timer expires 816. In response to the codec rate increase timer expiring, user equipment 808 increases the codec rate by one step 818. The codec rate increase by user equipment 808 includes sending a packet with a Codec Mode Request (CMR) 820, requesting a rate increase to 7.4 kbps, back to client 802 via node 806 and network 804. At the same time as requesting the rate increase, user equipment 808 restarts the codec rate increase timer 822. Eventually, the rate increase request from user equipment 808 is received by client 802, and client 802 increases the transmission rate to 7.4 kbps 824, as requested. The increased codec rate does not result in congestion, so data packets continue not to be marked.

Eventually, the restarted codec rate increase timer expires 826. In response to the codec rate increase timer expiring again, user equipment 808 increases the codec rate by another step 828. This codec rate increase by user equipment 808 includes sending a packet with a Codec Mode Request (CMR) 830, requesting a rate increase to 12.2 kbps, back to client 802 via node 806 and network 804. At the same time as requesting the rate increase, user equipment 808 restarts the codec rate increase timer 832. Eventually, the rate increase request from user equipment 808 is received by client 802, and client 802 increases the transmission rate to 12.2 kbps 834, as requested. The further increased codec rate does not result in congestion, so data packets continue not to be marked.

Figure 9:
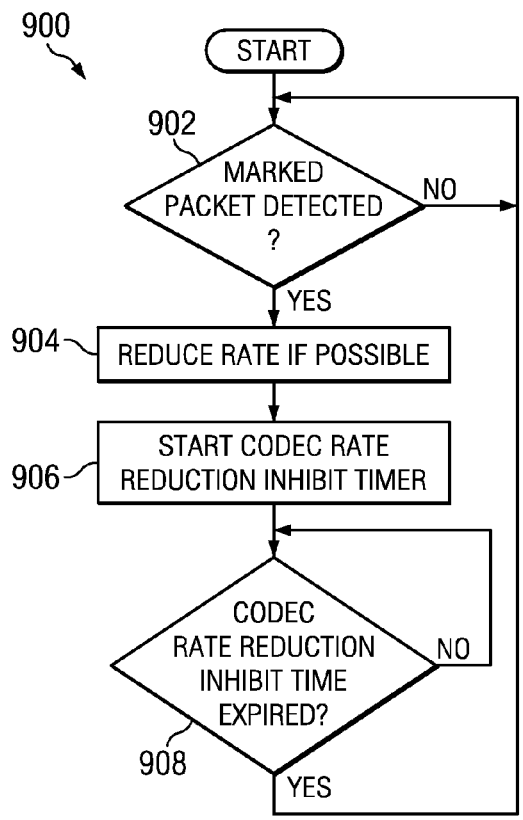
FIG. 9 is a flow chart of a method of codec rate reduction in accordance with an illustrative embodiment.

The flowchart of FIG. 9 illustrates an example method 900 for codec rate reduction in accordance with an illustrative embodiment. Method 900 may be implemented, for example, in user equipment, such as in user equipment 300 of FIG. 3. Received data packets are examined, preferably continuously, to determine when a packet marked "Congestion Experienced" is detected (step 902). When a marked packet is detected, the rate is reduced, if possible (step 904). For example, step 904 may include reducing the codec rate by one step within a set of the negotiated or specified codec rates or one step according to a codec rate reduction sequence. It may not be possible to reduce the codec rate if the codec rate is already at the lowest rate. Step 904 may include generating and sending an appropriate codec rate change request from user equipment to the network. The codec rate reduction inhibit timer is started (step 906), preferably at substantially the same time or simultaneously with step 904. Steps 904 and 906 may be performed in any order. Until the codec rate reduction inhibit timer expires, no further action is taken to reduce the rate, even if another marked data packet is received during this time. When it is determined that the codec rate reduction inhibit timer has expired (step 908), the method returns to step 902 to look for marked data packets indicating that further rate reduction is required.

Figure 10:
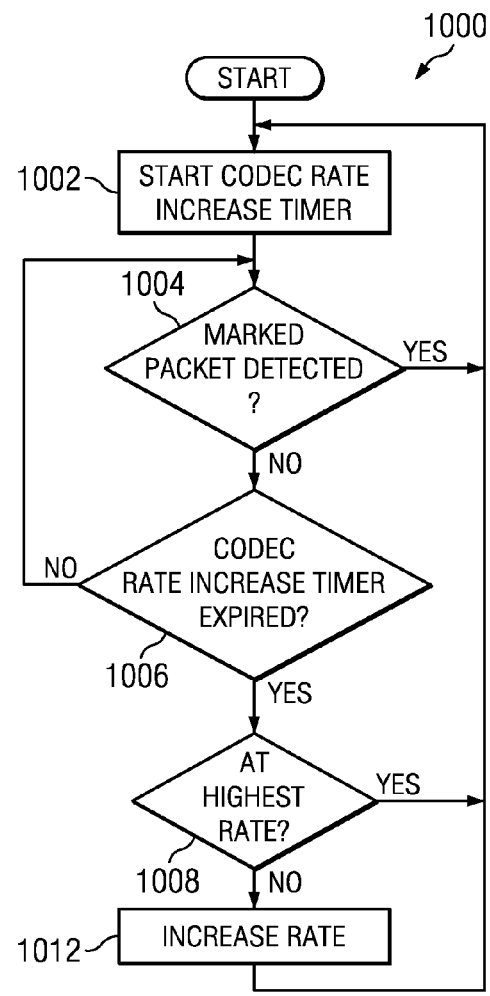
FIG. 10 is a flow chart of a method of codec rate increase in accordance with an illustrative embodiment.

The flowchart of FIG. 10 illustrates an example method 1000 for codec rate increase in accordance with an illustrative embodiment. Method 1000 may be implemented, for example, in user equipment, such as in user equipment 300 of FIG. 3. Method 1000 begins by starting a codec rate increase timer (step 1002). It is determined whether a packet marked "Congestion Experienced" is received during the time that the codec rate increase timer is running (step 1004). If a marked packet is received during the time that the codec rate increase timer is running, the codec rate increase timer is restarted, by returning to step 1002. It is determined when the codec rate increase timer expires (step 1006). When the codec rate increase time expires, it is determined whether the current rate is the highest rate (step 1008). If it is determined that the current rate is the highest rate, then no further rate increase is possible, and the codec rate increase timer is restarted by returning to step 1002. If it is determined that the current rate is not the highest rate, then the codec rate is increased (step 1012). Step 1012 may include increasing the codec rate by one step within a set of negotiated codec rates or by one step according to a codec rate increase sequence. Step 1012 may include generating and sending from user equipment an appropriate codec rate change request. The codec rate increase timer is restarted after increasing the rate, by returning to step 1002.

Figure 11:
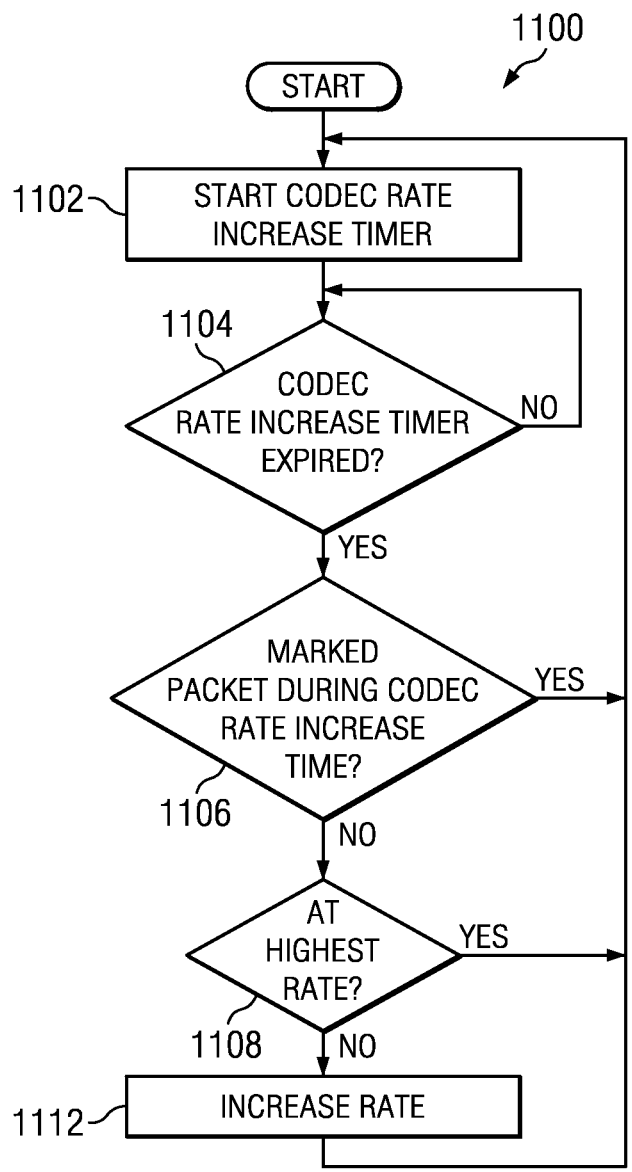
FIG. 11 is a flowchart of another method of codec rate increase in accordance with an illustrative embodiment.

The flowchart of FIG. 11 illustrates an example of another method 1100 for codec rate increase in accordance with an illustrative embodiment. Method 1100 may be implemented, for example, in user equipment, such as in user equipment 300 of FIG. 3. Method 1100 begins by starting a codec rate increase timer (step 1102). It is determined when codec rate increase timer expires (step 1104). When codec rate increase timer is determined to have expired, it is determined whether a packet marked "Congestion Experienced" was received during the rate increase time timed by the codec rate increase timer (step 1106). If a marked packet was received during the rate increase time, the codec rate increase timer is restarted, by returning to step 1102. If a marked packet was not received during the rate increase time, it is determined whether the current rate is the highest rate (step 1108). If the current rate is the highest rate, no increase in the rate is possible, and the codec rate increase timer is restarted by returning to step 1102. If the current rate is not the highest rate, the codec rate is increased (step 1112). Step 1112 may include increasing the codec rate by one step within a set of negotiated codec rates or by one step according to a codec rate increase sequence. Step 1112 may include generating and sending from user equipment an appropriate codec rate change request. The codec rate increase timer is restarted after increasing the rate, by returning to step 1002.

Figure 12A:
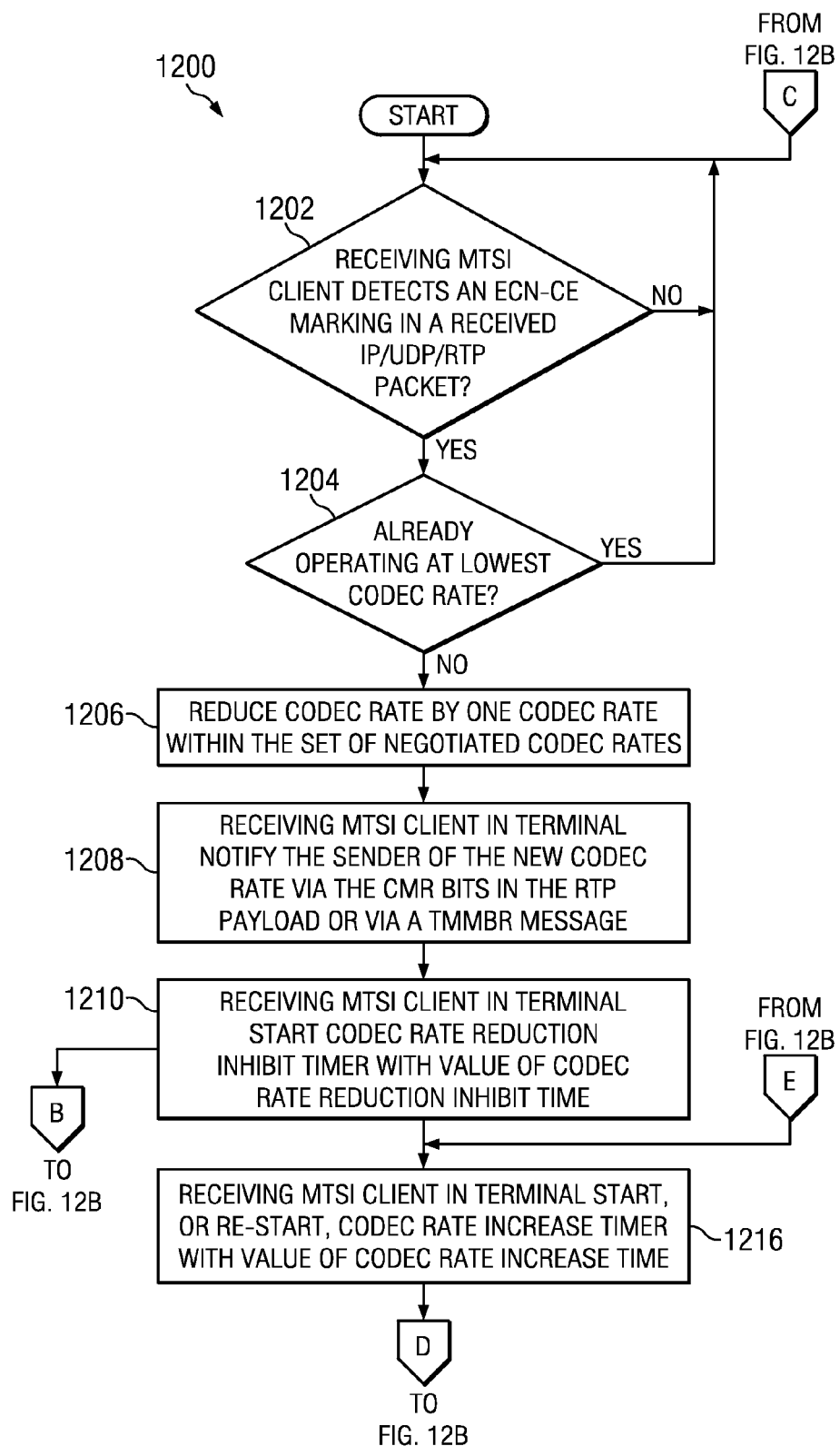
FIG. 12 is a flowchart of a method of codec rate adaptation in accordance with an illustrative embodiment.
Figure 12B:
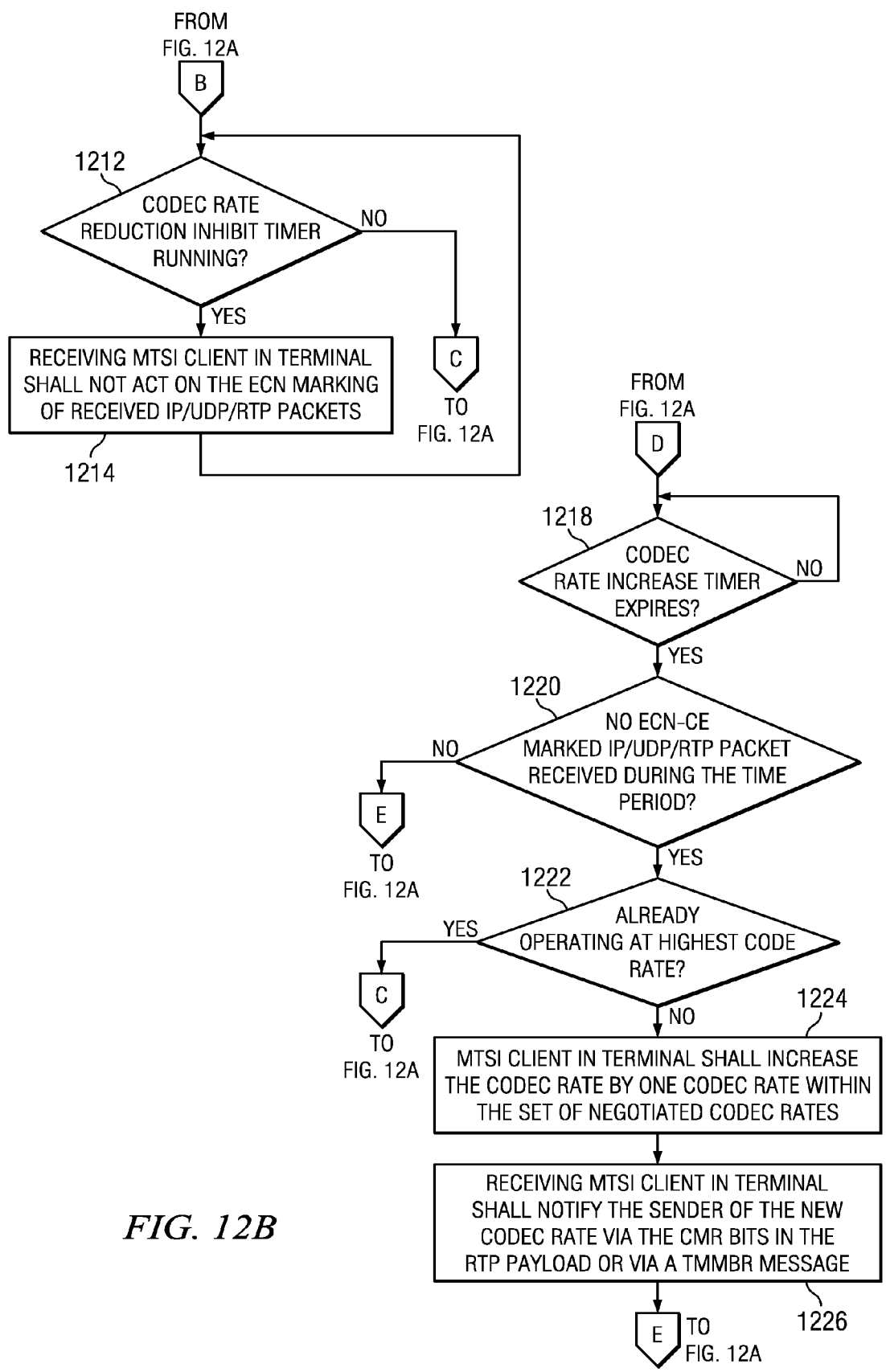

The flowchart of FIG. 12 illustrates another example of a method 1200 for rate adaptation in accordance with an illustrative embodiment. In accordance with method 1200, the adaptation of codec rate using Explicit Congestion Notification (ECN) is controlled by two parameters, the code rate reduction inhibit time and the code rate increase time. These parameters may be configured into a Multimedia Telephony Services for IP Multimedia Subsystem (MTSI) client based on operator policy, for example, using Open Mobile Alliance-Device Management (OMA-DM). If the parameters are not configured, then default values of 200 ms and 10 seconds, respectively, may be used.

It is determined if a receiving MTSI client in terminal that supports and has negotiated ECN detects an ECN "Congestion Experienced" (CE) marking in a received Internet Protocol/User Datagram Protocol/Real-time Transport Protocol (IP/UDP/RTP) packet (step 1202). If a marked packet is received, it is determined whether the receiving MTSI client is already operating at the lowest codec rate (step 1204). If the MTSI client is not already operating at the lowest codec rate, the receiving MTSI client in terminal reduces the codec rate by one codec rate within the set of negotiated codec rates (step 1206). The receiving MTSI client in terminal notifies the sender of the new code rate via the Codec Mode Request (CMR) bits in the RTP payload if supported by the codec and via a Temporary Maximum Media Stream Bit Rate Request (TMMBR) message if the RTP payload for the codec does not support a CMR field (step 1208). The receiving MTSI client in terminal starts a codec rate reduction inhibit timer with the value of the codec rate reduction inhibit time (step 1210). The receiving MTSI client in terminal starts or, if already started running, restarts a codec rate increase timer with the value of the codec rate increase time (step 1216).

It is determined whether the codec rate reduction inhibit timer is running (step 1212). If the codec rate reduction inhibit timer is running, the receiving MTSI client in terminal will not act on the ECN marking of received IP/UDP/RTP packets (step 1214). If the codec rate reduction inhibit timer expires, the receiving MTSI client in terminal shall again act on the ECN marking of received IP/UDP/RTP packets.

It is determined whether the codec rate increase timer expires (step 1218). It is determined if there is no ECN-CE marked IP/UDP/RTP packet received during the time period (step 1220). It is determined whether the rate is already at the highest codec rate (step 1222). If the codec rate timer expires and there is no ECN-CE marked IP/UDP/RTO packet received during the time period and the rate is not already at the highest codec rate the MTSI client in terminal increases the codec rate by one codec rate within the set of negotiated codec rates (step 1224). The receiving MTSI client in terminal notifies the sender of the new codec rate via the CMR bits in the RTP payload, if supported by the codec, and via a TMMBR message if the RTP payload for the codec does not support a CMR field (step 1226). The receiving MTSI client in terminal then starts the codec rate increase timer with the value of the codec rate increase time.

The flowcharts and block diagrams in the different depicted embodiments illustrate the architecture, functionality, and operation of some possible implementations of apparatus and methods in different illustrative embodiments. In this regard, each block in the flowchart or block diagrams may represent a module, segment, function, or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The description of the different illustrative embodiments has been presented for purposes of illustration and description, and is not intended to be exhaustive or to limit the embodiments to the form disclosed. Many modifications and variations will be apparent to those of ordinary skill in the art. In the illustrative examples, the user equipment has been described with respect to a mobile phone. The different illustrative embodiments may be applied to other types of platforms in addition to or in place of the ones described, such as a mobile platform, a stationary platform, a land-based structure, an aquatic-based structure, a space-based structure, a smart phone, a personal digital assistant, a desktop computer, a server computer, a set-top box, a game console, a workstation, and any other suitable platform. A component may be included in a platform in a number of different ways. For example, the component may be located inside the platform, outside of the platform, formed as part of the platform, mechanically secured to the platform, or otherwise associated with the platform.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A wireless communication device comprising:
a processor configured to:
detect an Explicit Congestion Notification (ECN) Congestion Experienced (CE) marking within an internet protocol (IP) packet header; and
transmit a request to reduce a bit rate to a reduced bit rate based on the detection of the ECN CE marking within the IP packet header,
wherein a value specifying the reduced bit rate is configured at the wireless communication device for ECN-based adaptation of the bit rate.

2. The wireless communication device of claim 1 wherein the wireless communication device is a user equipment configured with a Multimedia Telephony Services for Internet Protocol Multimedia Subsystem (MTSI) client.

3. The wireless communication device of claim 1 wherein the value of the reduced bit rate is configured at the wireless communication device based on an operator policy.

4. The wireless communication device of claim 1 wherein the value of the reduced bit rate is configured at the wireless communication device using Open Mobile Alliance—Device Management (OMA).

5. The wireless communication device of claim 1 wherein the value of the reduced bit rate comprises a default value.

6. The wireless communication device of claim 1 wherein the processor is further configured to determine whether the bit rate equals a lowest bit rate.

7. The wireless communication device of claim 6 wherein the processor is further configured to transmit the request to reduce the bit rate based on a determination that the bit rate does not equal the lowest bit rate.

8. A method in a wireless communication device, the method comprising:
detecting, at the wireless communication device, an Explicit Congestion Notification (ECN) Congestion Experienced (CE) marking within an internet protocol (IP) packet header; and
transmitting, by the wireless communication device, a request to reduce a bit rate to a reduced bit rate based on the detection of the ECN CE marking within the IP packet header,
wherein a value specifying the reduced bit rate is configured at the wireless communication device for ECN-based adaptation of the bit rate.

9. The method of claim 8 wherein the wireless communication device is a user equipment configured with a Multimedia Telephony Services for Internet Protocol Multimedia Subsystem (MTSI) client.

10. The method of claim 8 wherein the value of the reduced bit rate is configured at the wireless communication device based on an operator policy.

11. The method of claim 8 wherein the value of the reduced bit rate is configured at the wireless communication device using Open Mobile Alliance—Device Management (OMA).

12. The method of claim 8 wherein the value of reduced bit rate comprises a default value.

13. The method of claim 8 further comprising determining whether the bit rate equals a lowest bit rate.

14. The method of claim 13 further comprising transmitting the request to reduce the bit rate based on a determination that the bit rate does not equal the lowest bit rate.

15. A wireless communication device, comprising:
a processor configured to
detect an Explicit Congestion Notification (ECN) Congestion Experienced (CE) marking within an internet protocol (IP) packet header; and
refrain, during a period of time after the detection of the ECN CE marking within the IP packet header, from transmitting a request to increase a bit rate,
wherein the period of time is configured at the wireless communication device for ECN-based adaptation of the bit rate.

16. The wireless communication device of claim 15 wherein the period of time is configured based on an operator policy.

17. The wireless communication device of claim 15 wherein the period of time is configured using Open Mobile Alliance—Device Management (OMA).

18. The wireless communication device of claim 15 wherein the period of time comprises a default value.

19. The wireless communication device of claim 15 wherein the wireless communication device is a user equipment configured with a Multimedia Telephony Services for Internet Protocol Multimedia Subsystem (MTSI) client.

20. The wireless communication device of claim 15 wherein the processor is further configured to transmit the request to increase the bit rate after the period of time expires.

21. A method for a wireless communication device, the method comprising:
detecting, at the wireless communication device, an Explicit Congestion Notification (ECN) Congestion Experienced (CE) marking within an internet protocol (IP) packet header; and
refraining, during a period of time after the detection of the ECN CE marking within the IP packet header, from transmitting a request to increase a bit rate,
wherein the period of time is configured at the wireless communication device for ECN-based adaptation of the bit rate.

22. The method of claim 21 wherein the period of time is configured based on an operator policy.

23. The method of claim 21 wherein the period of time is configured using Open Mobile Alliance—Device Management (OMA).

24. The method of claim 21 wherein the period of time comprises a default value.

25. The method of claim 21 wherein the wireless communication device is a user equipment configured with a Multimedia Telephony Services for Internet Protocol Multimedia Subsystem (MTSI) client.

26. The method of claim 21 further comprising transmitting the request to increase the bit rate after the period of time expires.

27. A device comprising:
a processor configured to
receive, from a wireless communication device, a message associated with network congestion; and
based on receiving the message, reduce a bit rate between the device and the wireless communication device to a reduced bit rate,
wherein the reduced bit rate is configured at the device for ECN-based adaptation of the bit rate.

28. The device of claim 27 wherein the processor is further configured to receive, from the wireless communication device, a request to increase the bit rate.

29. The device of claim 27 wherein the device is a network node.

30. The device of claim 27 wherein the device is a user equipment configured with a Multimedia Telephony Services for Internet Protocol Multimedia Subsystem (MTSI) client.

31. The device of claim 27 wherein the message is a request to reduce the bit rate.

32. A method for a device, the method comprising:
receiving, from a wireless communication device, a message associated with network congestion; and
based on receiving the message, reducing a bit rate between the device and the wireless communication device to a reduced bit rate,
wherein the reduced bit rate is configured at the device for ECN-based adaptation of the bit rate.

33. The method of claim 32 further comprising receiving, from the wireless communication device, a request to increase the bit rate.

34. The method of claim 32 wherein the device is a network node.

35. The method of claim 32 wherein the device is a user equipment configured with a Multimedia Telephony Services for Internet Protocol Multimedia Subsystem (MTSI) client.

36. The method of claim 32 wherein the message is a request to reduce the bit rate.

* * * * *

UNITED STATES PATENT AND TRADEMARK OFFICE
CERTIFICATE OF CORRECTION

PATENT NO. : 8,416,690 B2  
APPLICATION NO. : 12/685630  
DATED : April 9, 2013  
INVENTOR(S) : Xiaoming Zhao et al.

Page 1 of 1

It is certified that error appears in the above-identified patent and that said Letters Patent is hereby corrected as shown below:

In the Claims

In column 24, claim 12, line 11, after "wherein the value of" insert --the--.

In column 24, claim 25, line 64, after "The method of" insert --claim--.

Signed and Sealed this
Eleventh Day of February, 2014

Michelle K. Lee
*Deputy Director of the United States Patent and Trademark Office*